(12) United States Patent
Kim et al.

(10) Patent No.: US 6,577,310 B1
(45) Date of Patent: Jun. 10, 2003

(54) 3D MESH CODING/DECODING METHOD AND APPARATUS FOR ERROR RESILIENCE AND INCREMENTAL RENDERING

(75) Inventors: Sung-jin Kim, Suwon (KR); Mun-sup Song, Yongin (KR); Euee-seon Jang, Suwon (KR); Mahn-jin Han, Seoul (KR); Seok-yoon Jung, Seoul (KR); Yang-seock Seo, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/441,679

(22) Filed: Nov. 17, 1999

(30) Foreign Application Priority Data

Dec. 1, 1998 (KR) .............................. 98-52327
Feb. 4, 1999 (KR) .............................. 99-3649
Feb. 13, 1999 (KR) .............................. 99-5239

(51) Int. Cl.$^7$ .............................................. G06T 15/10
(52) U.S. Cl. ...................... 345/427; 345/420; 345/423
(58) Field of Search ............................... 345/419, 440, 345/420, 423, 427

(56) References Cited

U.S. PATENT DOCUMENTS 5,905,507 A * 5/1999 Rossignac et al. .......... 345/440
6,262,737 B1 * 7/2001 Li et al. ...................... 345/419

OTHER PUBLICATIONS

Hughes, PL/I Programming, John Wiley & Sons, 1973, pp. 22–23.*

* cited by examiner

Primary Examiner—Mark Zimmerman
Assistant Examiner—Lance W. Sealey
(74) Attorney, Agent, or Firm—Burns, Doane, Swecker & Mathis, LLP

(57) ABSTRACT

A progressive and error resilient coding and decoding method of three-dimensional (3D) mesh data used in the fields of motion picture experts group-4 synthetic and natural hybrid coding (MPEG-4 SNHC), virtual reality modelling language (VRML) and the like. In transmitting 3D objects composed of 3D mesh data, it is very important to progressively and error-resiliently restore transmitted data as well as to effectively code the 3D mesh data. In the progressive restoration, in the event that a transmission data error is generated, partial restoration of the transmitted data is allowed. Thus, it is possible to minimize the amount of mesh data to be retransmitted and the standby time of a user. The progressive restoration method which is resistant to such transmission errors can be effectively applied in wireless communications or low transmission rate communications. In the progressive and error-resilient coding and decoding method, connectivity, geometry and photometry necessary for progressively coding 3D mesh data are constructed and then coded/decoded, thereby allowing incremental build-up and error resilience.

83 Claims, 23 Drawing Sheets x (green) = run number
x (blue) = vertex index
x (red) = bounding loop index

R = root
B = branch
L = leaf

MOBL0    MOBL1    MOBL2

FIG. 14A | sc | id | vg₁ | tt₁ | td₁ | ltg | vg₂ | tt₂ | td₂ | ltg | ... | vgₙ | ttₙ | (lbl) | tdₙ | ltg |

FIG. 14B | sc | id | vg₁ | lvg | vg₂ | lvg | ... | vgₙ | lvg |

FIG. 14C | sc | id | (vg−id) | vi | bp | tt_i | (lbl_i) | td_i | (ltg) |

FIG. 14D | sc | id | vg_i | tt_i | td_i | ltg |

| | |
|---|---|
| bnd[0][0] | bnd[0] |
| bnd[0][1] | bnd[1] |
| bnd[0][2] | bnd[2] |
| ... | ... |
| bnd[0][$n_1-1$] | bnd[$n_1-1$] |
| bnd[1][0] | bnd[$n_1$] |
| bnd[1][1] | bnd[$n_1+1$] |
| ... | ... |
| bnd[0][$n_2-1$] | bnd[$n_1+n_2-1$] |
| bnd[2][0] | bnd[$n_1+n_2$] |
| bnd[2][1] | bnd[$n_1+n_2+1$] |
| bnd[2][2] | bnd[$n_1+n_2+2$] |
| ... | ... |
| bnd[0][$n_3-1$] | bnd[$n_1+n_2+n_3-1$] |
| ... | ... |
| bnd[$m-1$][$n_m-1$] | bnd[$n_1+n_2+n_3+...+n_m-1$] |

FIG. 22

| I | R | tt | td |
|---|---|---|---|

FIG. 23A

| sc | 20 | $n_2-34$ | tt | td |
|---|---|---|---|---|

FIG. 23B

| sc | $n_1+20$ | $n_1+n_2-34$ | tt | td |
|---|---|---|---|---|

FIG. 24A
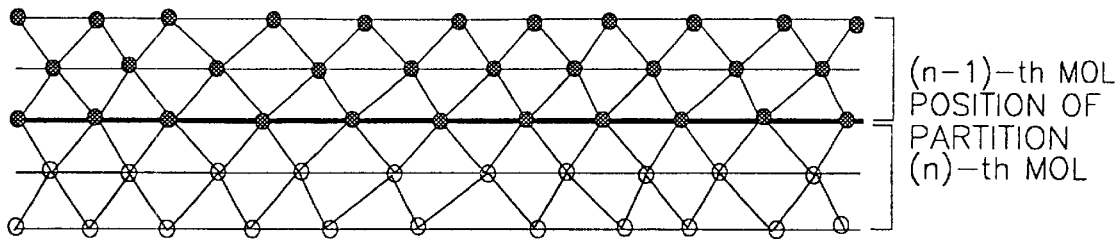
(n−1)-th MOL
POSITION OF
PARTITION
(n)-th MOL
FIG. 24B
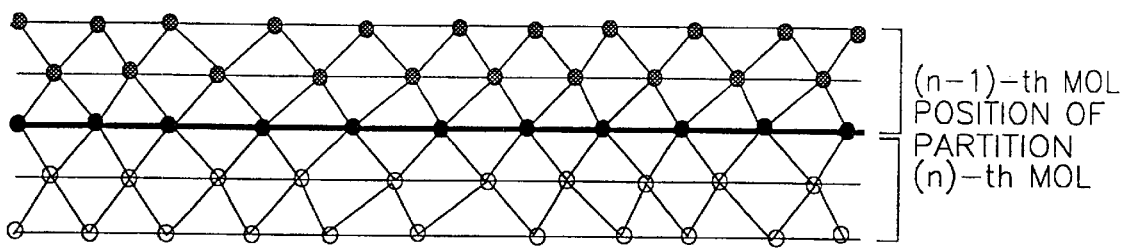
(n−1)-th MOL
POSITION OF
PARTITION
(n)-th MOL
FIG. 24C
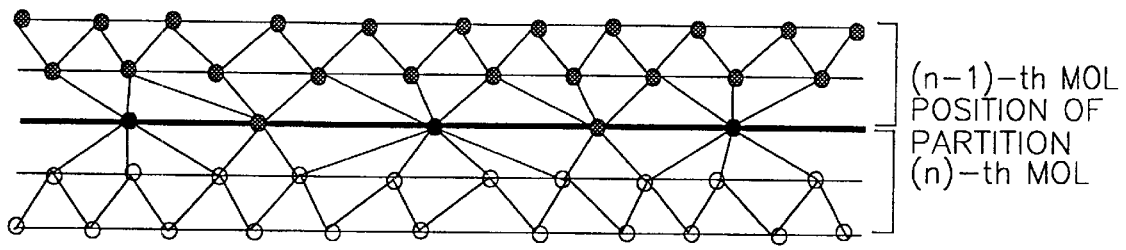
(n−1)-th MOL
POSITION OF
PARTITION
(n)-th MOL
FIG. 24D
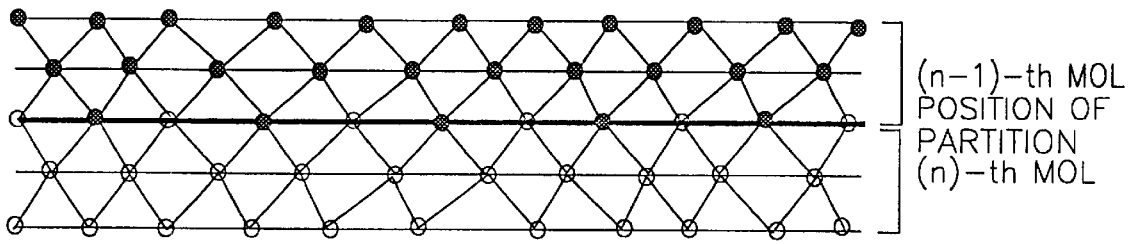
(n−1)-th MOL
POSITION OF
PARTITION
(n)-th MOL
FIG. 24E
| sc | id | vg | sc | id | Vi | bp(boundary predication) | tt | td | ... |

3D MESH CODING/DECODING METHOD AND APPARATUS FOR ERROR RESILIENCE AND INCREMENTAL RENDERING

BACKGROUND OF THE INVENTION

1. Field of the Invention

The present invention relates to a progressive coding/decoding method and apparatus of three-dimensional (3D) mesh data, characterized by error resilience and incremental build-up, used in the fields of motion picture experts group-4 synthetic and natural hybrid coding (MPEG-4 SNHC), virtual reality modelling language (VRML) and the like.

2. Description of the Related Art

In transmitting 3D objects composed of 3D mesh data, it is very important to incrementally and error-resiliently restore transmitted data as well as to effectively code the 3D mesh data. In the event that a data error is generated due to a transmission path error, progressive restoration allows transmitted data to be partially restored and minimizes the amount of mesh data to be retransmitted. Error-resilient restoration allows transmitted data to be independently restored in units of the transmitted data, irrespective of presence of errors generated in a specific unit of the transmitted data, thereby enhancing-the data restoration efficiency and reducing the standby time of a user. The progressive and error-resilient restoration method which is robust against such communication path errors can be effectively used in wireless communications or low transmission rate communications. The purposes of the present invention are to construct connectivity, geometry and photometry necessary for progressively coding 3D mesh data and providing resilience against data errors, and to propose a coding/decoding method of the same.

In the conventional coding method of 3D mesh data, since the mesh data is wholly coded, it is almost impossible to partially restore data before an entire bitstream is received. Also, due to transmission path errors generated during transmission, even if only a part of the data is damaged, the entire bitstream of data must be received again. For example, ISO/IEC JTC1/SC29/WG11 MPEG98/W2301, "MPEG-4 SNHC Verification Model 9.0" proposed by I.B.M. Corp. is currently being adopted as an MPEG-4 SNHC 3D mesh coding technology.

In MPEG-4 SNHC, mesh coding is designed based on VRML. In the VRML, a mesh is described in a node form referred to as an IndexedFaceSet. One of the main technologies for coding mesh data is a topological surgery proposed by I.B.M. Corp. According to this technology, it is assumed that a given mesh is the same as a sphere topologically. Then, the mesh is cut along a given cutting-edge to generate a triangle spanning graph having a binary tree structure. Here, the cutting-edge defined for cutting the mesh is configured such that it connects vertices, that is, it is given as a tree structure having a loop. The cutting-edge is referred to as a vertex spanning graph. Thus, two tree structures, that is, the triangle spanning graph and the vertex spanning graph, are coded/decoded, thereby restoring the original mesh without loss.

According to MPEG-4 SNHC, although there may be multiple IndexedFaceSets in a VRML file, compression is basically performed on the unit of one IndexedFaceSet. However, it is allowed to form a single IndexedFaceSet by several connected components.

In general, for fast graphics processing, modeling must be performed in units of triangles. These triangles are not formed randomly but are preferably connected to each other in the form of strips or fans. Also, the more symbols that are repeatedly represented, the better the compressibility is. To this end, a mesh formed by a single long triangular strip is proposed by I.B.M. Corp. in view of fast graphics processing and better compressibility.

FIGS. 1A through 1F illustrate a conventional procedure for generating a vertex spanning graph and a triangle spanning graph in an example of a triangular mesh. FIGS. 1A and 1D illustrate a method for cutting a mesh along cutting-edges drawn by a thick line. FIG. 1B illustrates the overall form of the cutting-edges. FIG. 1E illustrates the configuration of edges and vertices produced by cutting along the cutting-edges shown in FIG. 1B. FIG. 1C illustrates a vertex spanning graph made by connecting vertices which reference cutting points. FIG. 1F illustrates a triangle spanning graph defined as a strip which is a set of connected triangles generated by cutting the mesh along the vertex spanning graph. Also, if the triangle spanning graph is generated by the method shown in FIGS. 1A through 1F, the length of one of two branching runs in the triangle spanning graph can be considerably shorter than the other.

FIGS. 2A through 2D illustrate an example of a topological surgery technique applied to actual mesh data. In a vertex spanning graph, a branch can branch off into several branches. FIG. 3 illustrates an example of a vertex spanning graph having a loop, in which a vertex run returns to a location of one of the previous vertices. Since a mesh is generally formed of several connected components, each connected component forming the mesh generates a pair of a vertex spanning graph shown in FIG. 1F and a triangle spanning graph shown in FIG. 1C. Therefore, if a single IndexedFaceSet is coded, several triangle spanning graph-vertex spanning graph pairs can be obtained.

The method for restoring the data coded by the above-described topological surgery technology is as follows:

1. A bounding loop is generated using a vertex spanning graph.

2. When the third vertex of a triangle branching off in a triangle spanning tree is referred to as a Y-vertex, the Y-vertex is calculated using bitstreams of the triangle spanning tree, and sets of triangles or polygons having connectivity of a strip shape are generated. Here, the triangles or polygons are formed using a triangle marching bit of the triangle spanning graph.

3. Meshes are restored in accordance with the topological geometry using the mesh data of a tree structure constructed through the steps 1 and 2.

Lossless compression using arithmetic coding of the vertex spanning graph and the triangle spanning graph has been proposed by I.B.M. Corp. However, according to this method, in order to reconstruct the original structure, all bitstreams must be input and the following problems arise:

1. Since all bitstreams must be input in order to decode mesh data, in any event of a transmission error, all bitstreams must be retransmitted.

2. In the case where the magnitude of compressed data is large, compared to the bandwidth, it takes a long period of time to transmit the data completely and a user must wait during such a period of time. In order to reduce the user's waiting time, meshes must be partially restored and rendered using the transmitted data. However, according to the existing technologies, the number of triangles which can be restored is small, compared to the amount of transmitted bits, in view of the structure of bitstreams.

To overcome the disadvantages of the conventional technology, the following functions must be satisfied.

1. Mesh data must be partitioned by an effective unit size in view of the bandwidth of a transmission path or the characteristic of a decoder, and error resilience must be allowed so that bitstreams having the unit size are restored and rendered by the decoder.

2. Incremental coding/decoding methods must be allowed so that partial restoration and rendering of only a part of the currently received data is possible.

Implementation of these two functions while maintaining the basic structure of the conventional method proposed by I.B.M. Corp. depends on effective processing of the bounding loop and Y-vertex, as shown in FIG. 4. In FIG. 1F, points 10, 14 and 18 are Y-vertices. In order to calculate a Y-vertex, at least one of two branching triangle runs must be processed. In other words, for triangles within a triangle run, the indices of the three vertices of each triangle can be determined using the marching bit pattern and the bounding loop. However, in order to determine the indices of Y-vertices which are the third vertices of branching triangles, all bitstreams for one of two triangle runs next to the branching triangles must be received. Therefore, the triangles next to the branching triangles cannot be restored to be rendered until subsequent bitstreams are received. This problem does not occur in the conventional method proposed by I.B.M. Corp., which is based on the assumption that all bitstreams are received in the decoder. However, in order to restore and display the triangles incrementally, this problem must be solved.

The definitions of terms used in the art related to the invention will be first described as follows.

Polygonal mesh: A polygonal mesh is defined by coordinates (geometry) in a 3D space of vertices, the relationship (connectivity) between the respective faces and the vertices forming the faces, and photometry such as color, normal or texture information, which do not affect the geometric structure of a mesh but affect the appearance of the mesh.

Face: A face is a set of vertex indices and a corner is a pair of (face, vertex) sets. A simple face is a set of vertex indices in which different indices form a face. In this invention, only a polygonal mesh consisting of simple faces will be dealt with.

Edge: A edge is a pair of vertex indices. If an edge appears on only one face in a polygonal mesh, the edge is defined as a "boundary" edge. If one and the same edge appears on several faces, the edge is defined as a "singular" edge. If an edge appears on only two neighboring faces, the edge is defined as an "internal" edge. The boundary edge and the internal edge are defined as "regular".

Dual graph: One point is defined within each face of a mesh and then points defined above and passing through the internal edge between neighboring faces are connected to be defined as a dual graph. FIG. 5A illustrates a polygonal mesh and FIG. 5B is a dual graph of the polygonal mesh shown in FIG. 5A.

Virtual reality modeling language (VRML): The VRML is a graphic standard format prepared for describing and transmitting a virtual space over the Internet.

Moving Picture Experts Group (MPEG): The MPEG is a group for carrying out international standardization activities for standardizing compression formats for transmitting a variety of media such as video.

Mesh: A mesh is a representation of an object constructed of several polygons.

Node: A node is a vertex in a vertex spanning graph or a minimum description unit used in VRML.

Topological surgery: Topological surgery is a mesh coding method proposed by I.B.M. Corp. in which a mesh is cut along a given path in order to make the mesh into the form of strips.

Vertex spanning graph: A vertex spanning graph is a path for cutting a mesh in the topological surgery.

Triangle spanning graph: A triangle spanning tree is a binary tree in the form of a triangle strip produced by cutting a mesh along the vertex spanning graph.

vlast: vlast indicates whether the current run is the last branch or not. If the current run is the last branch, the value of vlast is 1; otherwise it is 0.

vleaf: vleaf indicates whether the current vertex run ends with a leaf or a branch. If the current vertex run ends with a leaf, the value of vleaf is 1; otherwise it is 0.

vrun: A vrun is a set of connected vertices and ends with a branch or vleaf.

vlength is the length of a vertex run.

loopstart: The leaf of a vertex run may meet another vertex run to form a loop. In such a case, the start of the loop is indicated by the loopstart.

loopend: In the case when the leaf of a vertex run forms a loop, the end of the loop is indicated by the loopend.

loopmap: A loopmap indicates connectivity between the loopstart and the loopend and is a set of indices connecting edges from the loopend to the loopstart.

trun: A trun is a set of consecutive triangles and the end thereof is a leaf triangle or a branching triangle.

tleaf: tleaf indicates whether the run of a triangle ends with a leaf triangle or a branching triangle. If the run of a triangle ends with a leaf triangle, the value of tleaf is 1; otherwise it is 0.

tmarching: tmarching describes the marching aspect of triangles. If a strip has an edge at its right boundary, the value of tmarching is 1. If a strip has an edge at its left boundary, the value of tmarching is 0.

polygonedge: polygonedge indicates whether a current edge is given from the original mesh model or inserted for representing the polygon as a set of triangles. If a current edge is given from the original mesh model, the value of polygonedge is 1; otherwise it is 0.

triangulated: triangulated indicates the presence of a polygon in the mesh.

nvertices: nvertices indicates the number of vertices.

nloops: nloops indicates the number of loops.

nvedges: nvedges indicates the magnitude of a vrun.

nvleaves: nvleaves indicates the number of leaves in a vertex spanning graph.

bitspernvedges: bitspernvedges indicates the number of bits used for nvedges.

simple: If loops are present in a vertex spanning graph, the value of simple is 0, and 1, otherwise.

ntriangles: ntriangles indicates the number of triangles in a triangle spanning graph.

ntbranches: ntbranches indicates the number of triangles branching off in a triangle spanning graph.

nmarchingtrans and nmarchingkeepleft are statistical models for compression of Tmarching.

npolytrans and nkeeppoly are statistical models for compression of Polygonedge.

FIG. 6 is a conceptual block diagram of a conventional three-dimensional (3D) mesh information coding method. In FIG. 6, a 3D mesh object 100 is divided into connectivity, geometry and photometry and coded by a coding part 101 including a connectivity coder 102, a geometry coder 103 and a photometry coder 112. Here, vertex structure information 105 is transmitted from the connectivity coder 102 to the geometry coder 103. The information compressed by the connectivity coder 102, the geometry coder 103 and the photometry coder 112 is combined into a bitstream and the bitstream is compressed to a compressed bitstream 111 by an entropy coder 104.

The compressed bitstream 111 is input to a decoding part 112. In other words, the compressed bitstream 111 is decompressed and divided into connectivity, geometry and photometry via an entropy decoder 106 to then be decoded by a connectivity decoder 107, a geometry decoder 108 and a photometry decoder 113, respectively. Like in the coding part 101, vertex structure information 109 is transmitted from the connectivity decoder 107 to the geometry decoder 108. A decoded 3D mesh object 110 can be constructed using the decoded connectivity, geometry and photometry.

In FIG. 6, a 3D mesh can be transmitted in the form of a compressed bitstream in a communication path. However, since the conventional MPEG data compression method employs the entropy coder 104, the method is weak against transmission errors generated in a communication path. Therefore, the present invention proposes a technology for solving the transmission errors and progressively restoring 3D mesh data using transmitted connectivity, geometry and other information.

SUMMARY OF THE INVENTION

To solve the above problems, it is an objective of the present invention to provide a method for progressively coding/decoding 3D mesh information, by which a network load and a transmission time can be reduced by re-transmitting only a part where a transmission error is generated or restoring the data independently from the part having a transmission error, an increase in the amount of bits generated due to error restoration dependent on network layers can be minimized, and the 3D mesh information can be progressively restored using connectivity, geometry and photometry of the transmitted part.

Accordingly, to achieve the above objective, there is provided a method of coding a polygonal three dimensional (3D) mesh object (MO) comprising the steps of (a) dividing the polygonal 3D MO into one or more connected components, (b) generating a vertex graph and triangle tree/triangle data for each of the connected components, and (c) reconstructing the vertex graph and triangle tree/triangle data constituting the connected component in conformity with mesh object base layers (MOBLs) each capable of being independently decoded for the respective connected components and then coding the same.

According to another aspect of the present invention, there is provided a progressive and error-resilient method of coding a polygonal three dimensional (3D) mesh object (MO), including the steps (a) dividing the polygonal 3D MO into one or more connected components, (b) generating a vertex graph and a pair of triangle tree/triangle data for each of the connected components, and (c) coding the vertex graph and triangle tree/triangle data constituting the connected components in conformity with mesh object base layers (MOBLs) each having a fixed type of bitstream capable of being independently decoded for the respective connected components.

According to the present invention, there is also provided a progressive and error-resilient coding method of a polygonal three dimensional (3D) mesh object (MO), including the steps (a) dividing the polygonal 3D MO into one or more connected components, (b) generating a vertex graph and a pair of triangle tree/triangle data for each of the connected components, and (c) coding the vertex graph and triangle tree/triangle data constituting the connected components in conformity with mesh object base layers (MOBLs) each having a variable bitstream type in accordance with the properties of information to be coded, capable of being independently decoded for the respective connected components.

According to another aspect of the present invention, there is provided a progressive and error-resilient coding method of a polygonal three dimensional (3D) mesh object (MO), including the steps (a) dividing the polygonal 3D MO into one or more connected components, (b) generating a vertex graph and a pair of triangle tree/triangle data for each of the connected components, and (c) coding the vertex graph constituting the connected components, and (d) constructing the triangle tree/triangle data as virtual connected components and coding the same by adding virtual bit pairs to data partitions obtained by partitioning the triangle tree/triangle data.

To achieve the above object of the present invention, in coding a triangle three dimensional (3D) mesh object (MO) for incremental build-up and error resilience, there is provided a method for partitioning the triangle 3D MO into data partitions to be packetized, the method including the steps (a) calculating total bit generation amounts of triangles while the triangles contained in a triangle tree are sequentially traversed, (b) accumulating the total bit generation amounts calculated in step (a), and c) if the accumulated value of step (b) is smaller than the product of a packet size and a packet allowance, repeatedly performing the steps (a) and (b) on the next traversed triangle contained in the triangle tree, and if not, triangle tree/triangle data of the traversed triangles are partitioned into data partitions to be packetized.

The present invention also provides a progressive and error-resilient decoding method of a polygonal three dimensional (3D) mesh object (MO), including the steps (a) dividing input bitstreams into units of mesh object base layers (MOBLs), (b) determining a partition type of the MOBLs, (c) if a vertex graph is contained in the MOBLs, decoding the vertex graph to generate a bounding loop table, (d) if triangle tree/triangle data is contained in the MOBLs, decoding the triangle tree/triangle data to generate 3D MO, and (e) repeatedly performing the steps (a) through (d) to generate a 3D MO.

According to another aspect of the present invention, there is provided a progressive and error-resilient decoding method of a polygonal three dimensional (3D) mesh object (MO), including the steps (a) dividing input bitstreams into units of mesh object base layers (MOBLs), (b) determining a partition type of the MOBLs, (c) if a vertex graph is contained in the MOBLs, decoding the vertex graph to generate a bounding loop table, (d) if triangle tree/triangle data is contained in the MOBLs, decoding the triangle tree/triangle data in units of connected components to generate triangle 3D MO, and (e) if the connected components in the step (d) are virtual connected components, repeatedly performing the steps (a) through (d), and if not, completing the generation of a triangle 3D MO.

BRIEF DESCRIPTION OF THE DRAWINGS

The above objectives and advantages of the present invention will become more apparent by describing in detail a preferred embodiment thereof with reference to the attached drawings in which:

FIGS. 12A through 12I illustrate a fixed data partitioning method;

FIGS. 14A through 14D illustrate a variable data partitioning method;

FIGS. 15A through 15D illustrate partitions which are partitioned by the variable data partitioning method;

FIG. 21 illustrates a method of indexing a bounding loop and a method of coding the header information of the partitions produced thereby;

FIG. 22 illustrates data partitioning including a bounding loop;

FIGS. 23A and 23B illustrate methods of defining bounding loop indices;

FIGS. 24A through 24E illustrate coding of geometry;

DESCRIPTION OF THE PREFERRED EMBODIMENTS

Figure 7:
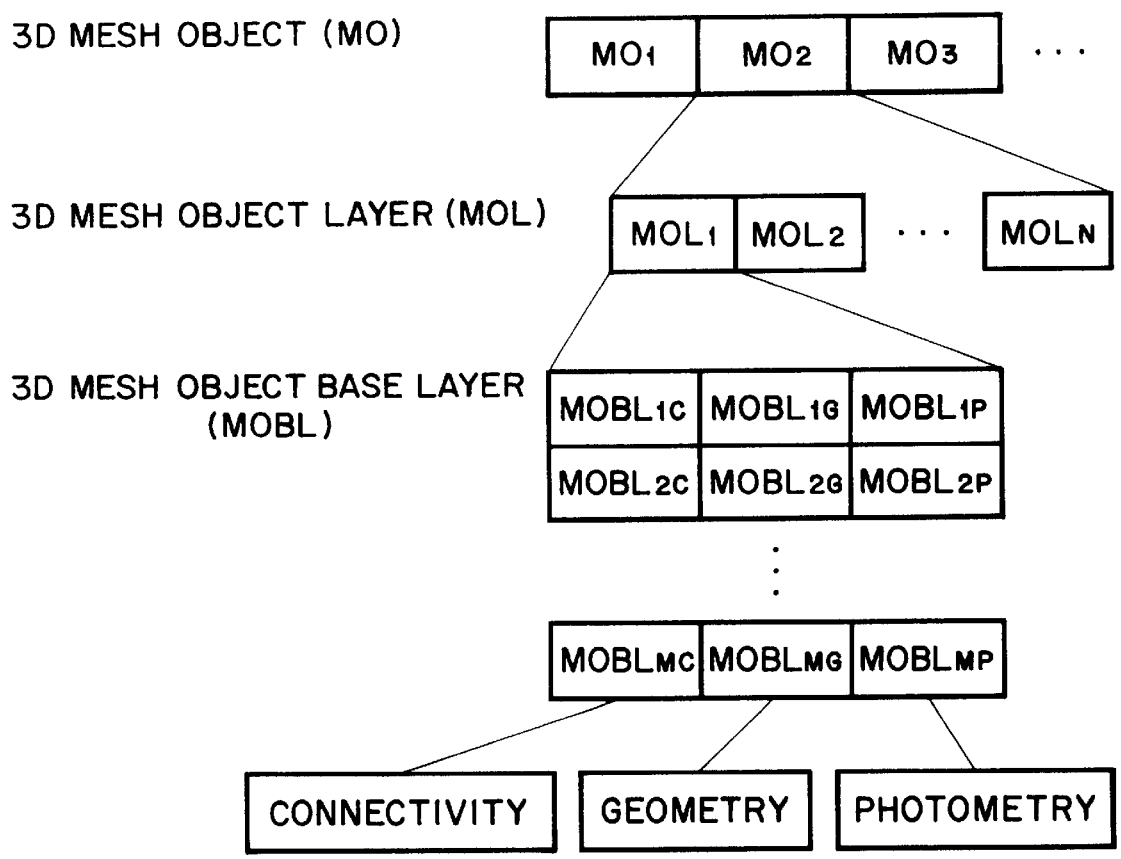
FIG. 7 is a conceptual diagram of progressive 3D mesh object information representation.

For progressive processing of a 3D mesh object, in the present invention, a new mesh structure shown in FIG. 7 is proposed. As shown in FIG. 7, a 3D mesh object (MO) can be divided into several connected or non-connected components. The components contained in the 3D mesh object can be reconstructed as several mesh object layers (MOLs). Here, each MOL contains one or more mesh object base layers (MOBLs). The MOL contains connectivity, geometry and photometry necessary for its own restoration. In other words, the MO is defined as the unit of a 3D mesh object to be coded and is divided into several layers according to variable picture quality and functions of mesh data. Each layer is defined as a mesh object layer (MOL). Also, when a 3D mesh object is formed of several non-connected independent mesh data units (that is, connected components), the independent mesh data units are combined or partitioned according to the size of data to be coded or other characteristics, which is defined as a mesh object base layer.

Figure 8A:
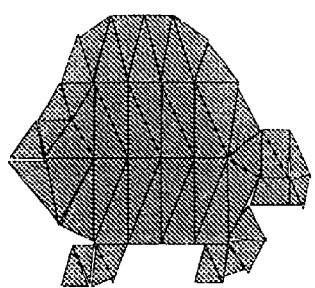
FIGS. 8A and 8B illustrate examples of 3D mesh object (MO) and mesh object base layer (MOBL)
Figure 8B:

FIGS. 8A and 8B illustrate a 3D mesh object (MO) and mesh object base layers (MOBLs).

Figure 9:
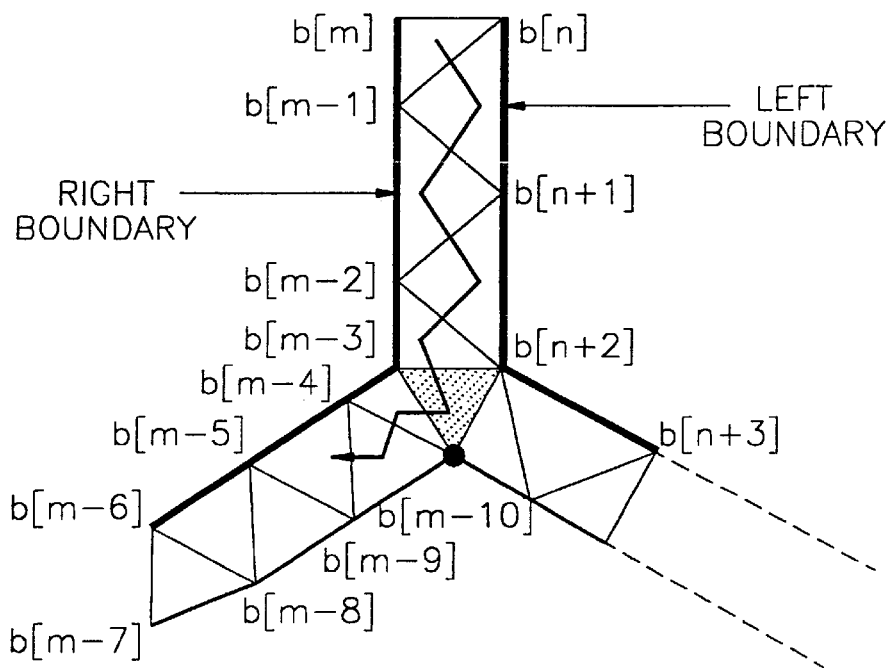
FIG. 9 is a conceptual diagram showing the relationship between a pair of triangle tree and triangle data and a bounding loop index.

In the above-described new mesh structure, a method of determining the index of a bounding loop into which consideration of a Y-vertex is taken, is required for more effectively performing progressive restoration/rendering. In order to restore a triangle mesh, as shown in FIG. 9, bounding loop indices of starting points of right and left boundaries are given in a partition of triangle tree (tt) and triangle data (td) pair. In FIG. 9, reference character m denotes a right start index, n denotes a left start index and a central arrow denotes the order of triangles coded. Here, based on the marching direction, the boundary positioned on the right of the triangle strip is a right boundary, the boundary positioned on the left of the triangle strip is a left boundary, and the shaded triangle inside is a branching triangle. In order to determine the bounding loop indices of the respective triangles of the tt/td pair, the following information is further necessary.

Triangle Prior to Branching Triangle

As shown in FIG. 9, in the case of triangles prior to a branching triangle, indices of the bounding loop increase by one in the left boundary and decrease by one in the right boundary. Thus, whenever a marching bit is decoded, three-vertices of the triangle can be immediately restored.

Branching Triangle

In FIG. 9, a branching triangle is composed of three vertices b[m−3], b[m−10] and b[n+2]. However, if the triangle information of the right branch in the branching triangle, that is, the information on the number of triangles, is not received, it is not possible to know the index m−10 in the bounding loop of the third vertex, i.e., Y-vertex. Thus, in order to determine the index of the Y-vertex, the information on the number of triangles in one of the side branches must be received. In order to know the number of branches on one side, the information on the triangle run in the tt/td pair is necessary. In FIG. 9, if the number of triangles of the right branches is p, the number of vertices used can be easily known as follows:

$$\text{number of vertices used in one side branch} = p+2. \quad \text{[Formula 1]}$$

For example, in FIG. 9, the indices of the bounding loop of the third vertex, i.e., Y-vertex, of the branching triangle can be determined using the fact that the index of the vertex on the right boundary is m−3 and that the number of triangles in the branch is 6, as follows:

Index of Y-vertex=(m−3)−(6+2−1)=m−3−7=m−10.

Triangles in the Branch Branching from the Branching Triangle

In the case when the Y-vertex index is provided, the respective triangles can be restored and rendered in the same manner as in the case when the triangle prior to a branching triangle is processed. However, if the Y-vertex of the branching triangle is not determined, the indices of the vertices of the triangle cannot be determined. This is because the indices of the vertices positioned on the left boundary cannot be determined if the Y-vertex in the right branch shown in FIG. 9 is not determined.

As described above, for progressive restoration and rendering, the Y-vertices must be effectively determined. Therefore, in the present invention, a method which allows progressive restoration and rendering by solving the Y-vertex problem occurring at the branching triangle is proposed.

Also, in the present invention, for error resilience, in partitioning mesh data in consideration of the bandwidth of a transmission path or the characteristics of a decoder, two methods, that is, a fixed partitioning method and a variable partitioning method, are used. Independent restoration and rendering of the partitioned data will be described below. Here, while the fixed partitioning method employs one identical partitioning method throughout all the given models, the variable partitioning method employs different partitioning methods according to the type of bitstream covered by data partitioning, that is, vertex graph, triangle tree, triangle data and the like.

<Progressive Coding Method with Y-vertex Taken Into Consideration>

In the conventional topological surgery, the coding order is fixed with respect to all of the tt/td pairs. According to this method, in order to improve only the progressive rendering performance, the information containing the indices and total number of all Y-vertices generated in the mesh data is transmitted to a decoder together with bitstreams. However, this method is undesirable in view of coding efficiency. Therefore, a more effective coding method which can satisfy both requirements, that is, a progressive rendering effect and high coding efficiency, is necessary.

In the topological surgery, the progressive rendering based on the restoration of polygons cannot be effectively achieved because the difference in the lengths of dependent trees is large and effective determination of the index of the Y-vertex of the branching triangle of which dependent tree has large-sized mesh data cannot be achieved. Thus, if the lengths of dependent trees are different, that is, if the sizes of two branching branches are not uniform, it is more effective to code the smaller branch previously in view of Y-vertex determination and rendering. Here, if the data is obtained through the topological surgery shown in FIGS. 2A through 2D, the number of triangles of one side branch may be smaller than that of the other side branch. Therefore, a method of individually determining the traversing order on the basis of branching triangles by offering the orientation information depending on the size of dependent trees, which is not defined in the topological surgery, is proposed in the present invention. In other words, if the orientation information is "1", the traversing order is the same as that given initially. Thus, the left (or right) branch is first visited. Otherwise, if the orientation information is "0", the right (or left) branch is first visited to be coded. Therefore, the effects of progressive decoding and rendering can be improved by transmitting the orientation information to a decoder. Also, since the orientation information allows an arbitrary mesh tree to be divided into a main tree and a dependent tree, more effective data partitioning can be achieved while maintaining the connectivity.

Figure 10A:
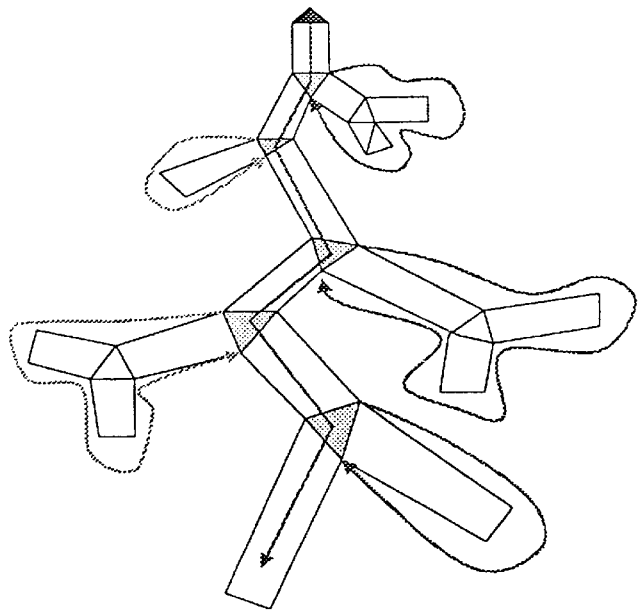
FIGS. 10A through 10C are conceptual diagrams of coding utilizing orientation information.
Figure 10B:
Figure 10C:
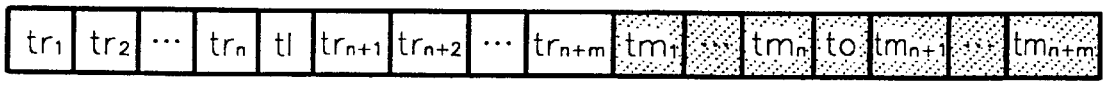

FIGS. 10A through 10C illustrate an example of coding utilizing orientation information, in which shaded triangles are branching triangles present in a main branch and having the orientation information, lines inside the binary mesh tree indicate a main branch having dependent trees, and lines outside the binary mesh tree indicate the traversing order in a dependent tree, that is, a mapping direction of indices of the bounding loop in a decoder. Here, the mapping directions of indices of the bounding loop, as shown in FIG. 10A, can be determined to be identical with the orientation information of each dependent tree. To the contrary, the mapping direction of indices of the bounding loop can be all defined as clockwise or counterclockwise, irrespective of orientation information of each dependent tree. Assuming that the number of triangles inside the dependent tree to be restored is $t_1$ the formulas of calculating Y-vertex values differ in accordance with the orientation information as follows.

In the case of coding the right branch first (i.e., when the orientation value is 1).

If the index of the vertex of a branching triangle in the right boundary of the bounding loop is p, the index of the Y-vertex is as follows:

Position of Y-vertex=p−t−1

In the case of coding the left branch first (i.e., when the orientation value is 0).

If the index of the vertex of a branching triangle in the left boundary of the bounding loop is q, the index of the Y-vertex is as follows:

Position of Y-vertex=q+t+1

In FIGS. 10B and 10C, reference character 'tr' denotes a triangle run, 'tl' denotes tleaf information, 'to' denotes orientation information and 'tm' denotes marching information. FIG. 10B shows the arrangement of orientation information in a triangle run and FIG. 10C shows the arrangement of orientation information in triangle data. The arrangement shown in FIG. 10B can be easily implemented. The arrangement shown in FIG. 10C allows rendering immediately after the data of a triangle is restored, thereby reducing the delay time, and consumes a smaller memory capacity in the architecture of a decoder, compared to that shown in FIG. 10B, thereby reducing the cost.

Figure 11A:
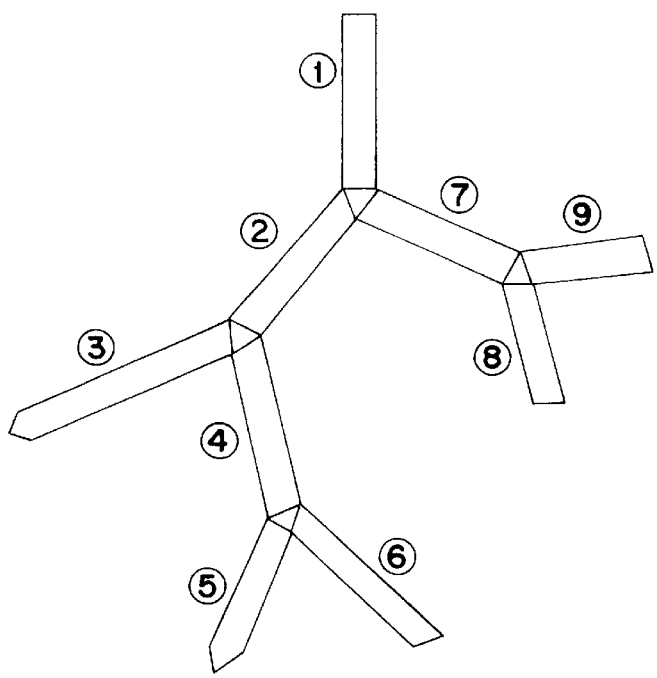
FIGS. 11A and 11B are diagrams for comparing the coding orders depending on the presence of the orientation information.
Figure 11B:
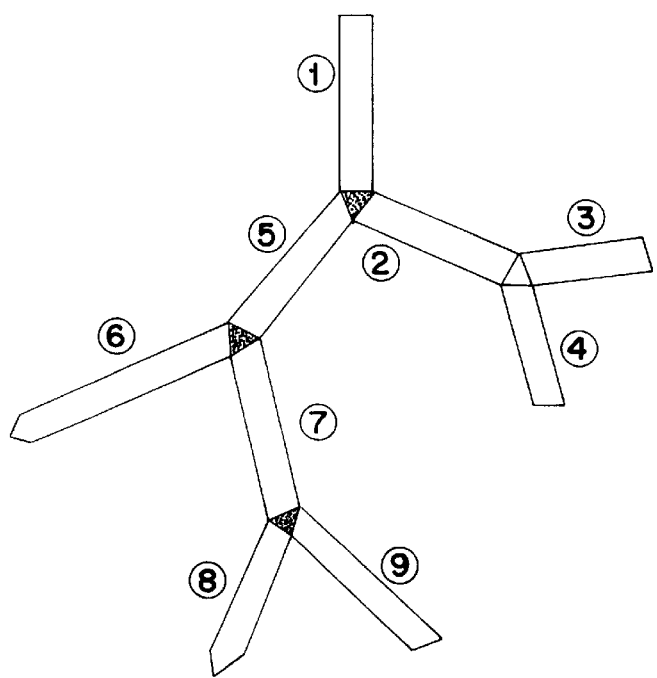

FIG. 11A shows the traversing order in the conventional topological surgery, and FIG. 11B shows the traversing order in accordance with the sizes of branches of either side of the branching triangles. FIGS. 11A and 11B are diagrams for showing the function of the orientation information. A method of determining orientation information in data partitioning will now be described.

<Progressive Coding with Error Resilience Taken Into Consideration>

In the event of the loss of data due to errors in a data transmission path or in bitstreams generated in a coding part, a decoding part must effectively treat the problem. Thus, the mesh data to be coded is divided into meaningful units, that is, partitions or mesh object base layers, to form partitions, and then the data partitions are transmitted in the processing unit having a predetermined size (to be abbreviated as "packet" hereinbelow). In other words, a packet is a bunch of bits arranged in a specific format and has a predetermined length. If data having a large length is transmitted via a transmission path, the transmission path which is used by a plurality of users may be congested. Thus, units of transmitted data are bound to have a predetermined length so that a plurality of users can share the transmission path having a limited capacity. A packet is obtained by binding bitstreams to be coded, whereas a partition is obtained by dividing original information (mesh) to be coded into appropriate units. Consideration must be taken during division to allow errors generated on the transmission path to be effectively handled in restoring the data on a receiver side. In other words, if all meshes are divided into meaningful parts, data partitions without an error can be perfectly restored on the receiver side, while only the coded bitstream having an error is damaged so as not to be restored. Here, the meaningful parts refer to the respective parts connected with one another in processing an animal picture, for example, arms, legs, body, etc. In partitioning, the size of a data partition is not fixed to a specific level, unlike the packet. In the present invention, various partitioning methods are proposed so that data can be effectively restored on the receiver side even if the received data has an error.

Partitioning data to be coded in such a manner has the following advantages:

By retransmitting only the data having an error, the load of a network and the standby time of a user can be reduced.

If independence among partitioned data units is ensured, mesh restoration and rendering are allowed using the data without error, thereby reducing the decoding delay due to the error.

Even if the mesh data is not entirely received, the currently received data can be progressively restored and rendered.

In comparison to the coding method by which the independence among data units is not ensured, mesh restoration capability is high since the data having no error is not retransmitted. Also, even in the case of retransmission, the transmission efficiency (the standby time for decoding) is improved.

<Fixed Partitioning Method>

Figure 1C:
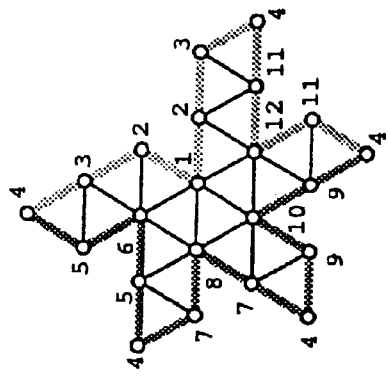
FIGS. 1A through 1F illustrate a conventional method for generating a vertex spanning graph and a triangle spanning graph in an example of a triangular mesh.
Figure 1F:
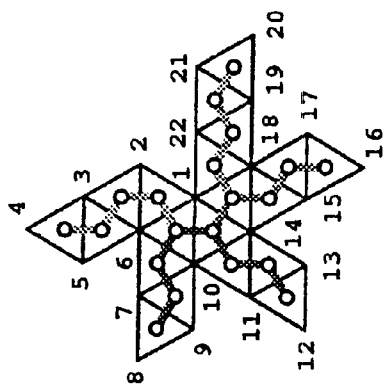
Figure 1B:
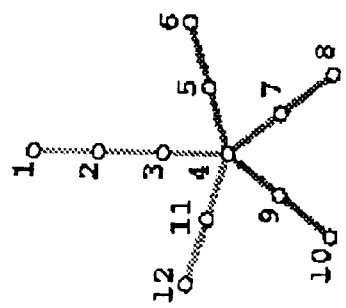
Figure 1E:
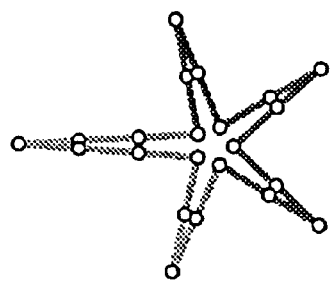
Figure 1A:
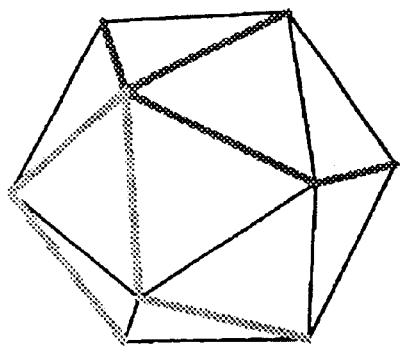
Figure 1D:
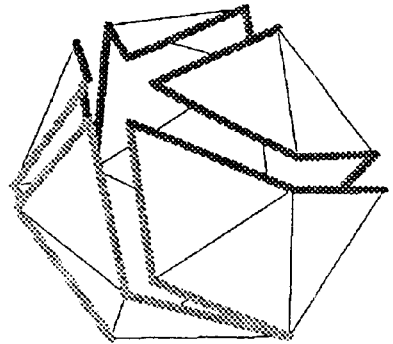
Figures 2A, 2B, 2C, 2D:
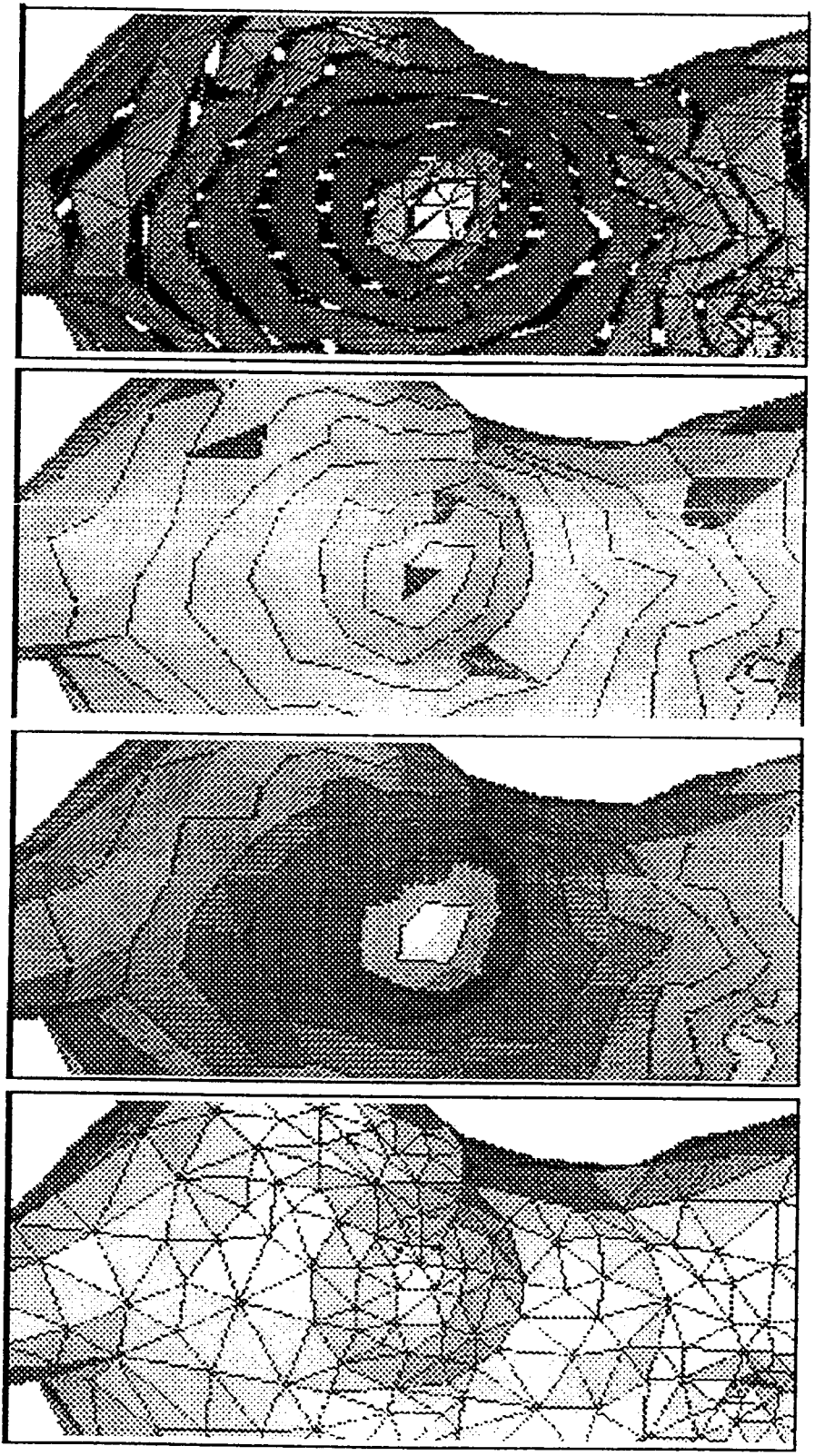
FIGS. 2A through 2D illustrate an example of a topological surgery.
Figure 3:
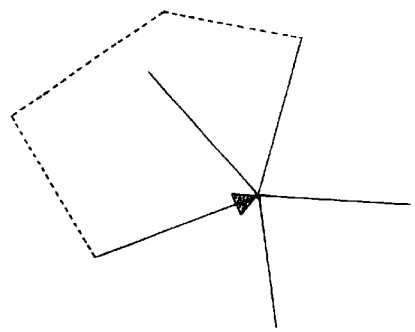
FIG. 3 illustrates an example of a vertex spanning graph having a loop.
Figure 4:
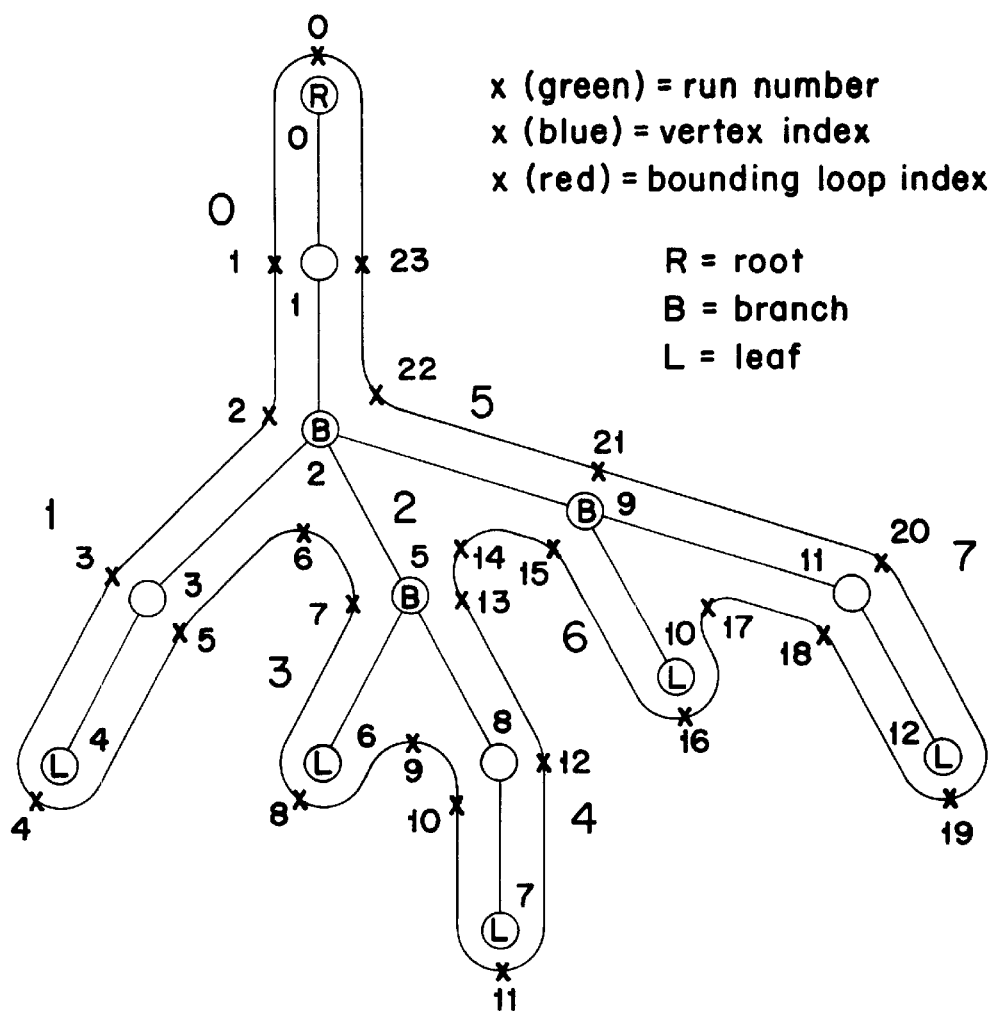
FIG. 4 illustrates the formation of a bounding loop in a topological surgery.
Figure 5A:
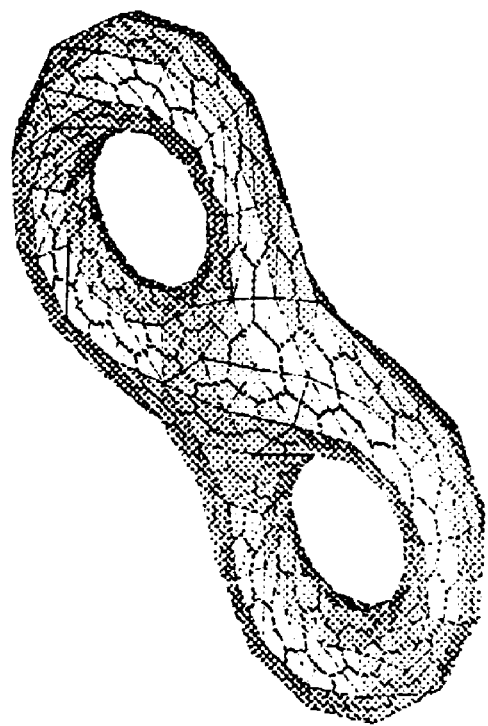
FIGS. 5A and 5B illustrate a polygonal mesh and an example of a dual graph thereof.
Figure 5B:
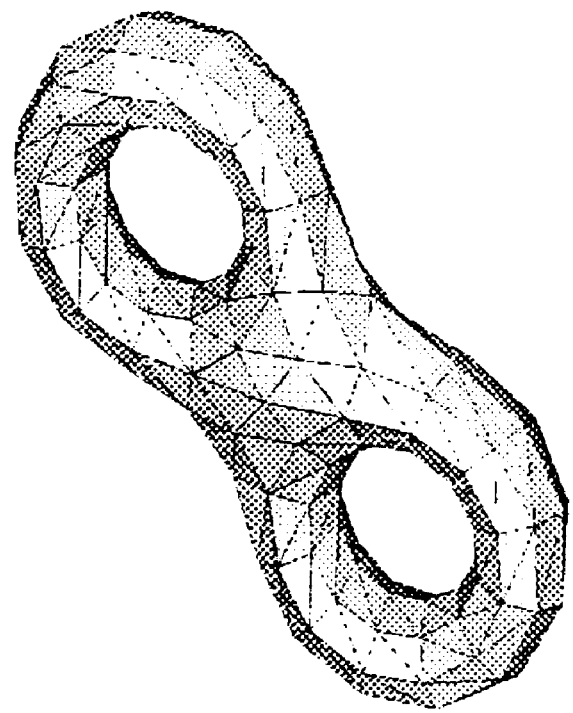
Figure 6:
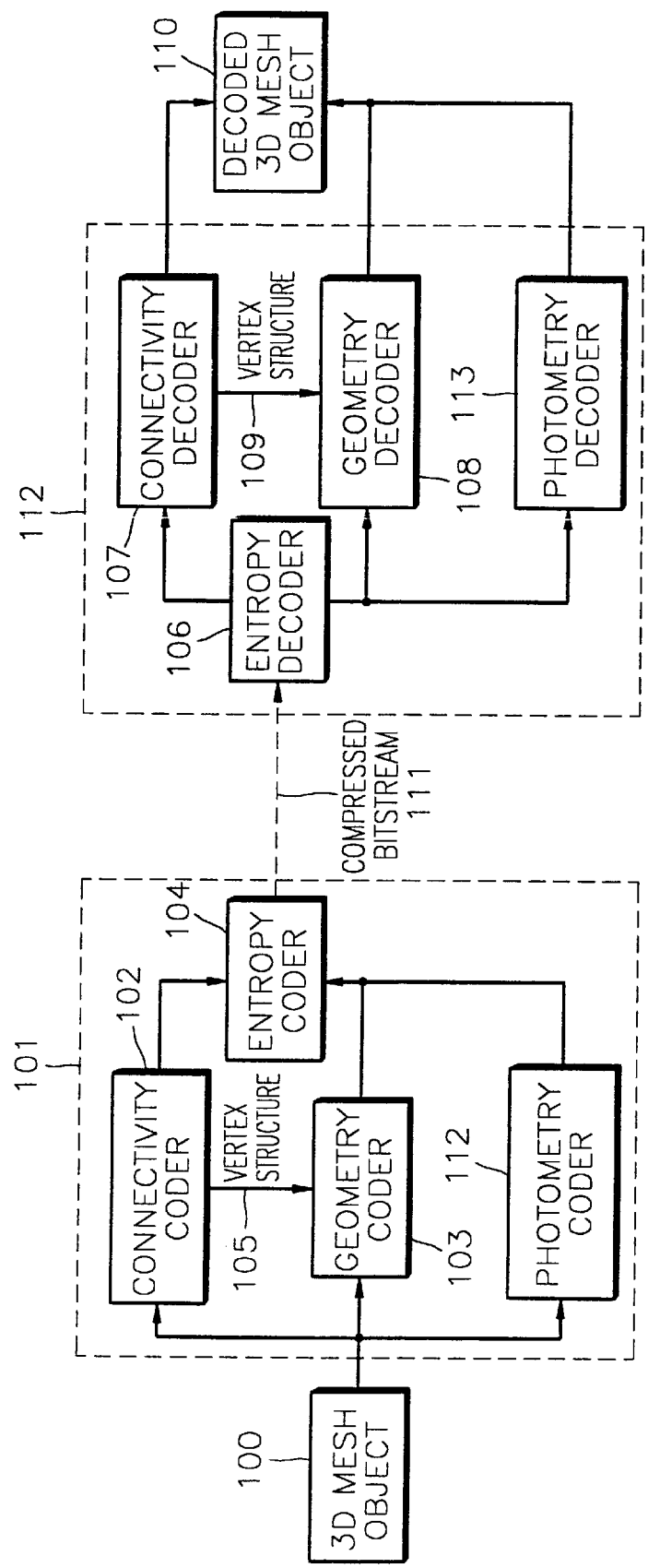
FIG. 6 is a conceptual diagram of a conventional three-dimensional (3D) mesh information coding method.

FIGS. 12A through 12I illustrate a fixed data partitioning method, in which reference character 'sc' denotes a start code representing the starting position of partitioning in packetized mesh bitstreams, 'id' denotes an marker of a partition, which is represented by 3D_MOBL_start_code and mobl_id, respectively, in the present invention. 'vg_id' denotes a marker used for specifying the vertex graph corresponding to the current tt/td pair to be restored, when several units of vertex graph data are bound to be processed in mesh data constructed by several connected components. In the syntax of the present invention, 'vg_id' is marked by codap_vg_id. Visiting index 'vi' denotes a marker representing the bounding_index of a root triangle of a partition, and includes left_index and right_index, as shown in FIG. 4, which are indicated by codap_left_idx and codap_right_idx, respectively, in the syntax of the present invention. 'bp' denotes a marker representing boundary_prediction and determines the coding method of geometry, color, normal and textCoord. In other words, a value of 1 means a coding method in which overlapping coding of previously coded vertices is allowed. A value of 0 means that vertices are coded without overlapping. 'bp' is indicated by codap_bdry_pred in the syntax of the present invention. 'lbl' is a marker for calculating Y-vertex indices of a branching triangle using the current partition data only by the decoder in the case when the current partition ends at the branching triangle and denotes the overall size of an arbitrary dependent tree connected with the branching triangle. 'lbl' is indicated by codap_branch_len in the syntax of the present invention. 'vg' denotes a vertex graph, 'tt' denotes a triangle tree, and 'td' denotes triangle data. 'Ivg' is a one-bit marker defined for representing the presence of connected components to be restored in a partition. If vg to be restored next is present, the value of 'Ivg' is 0; otherwise it is '1'. 'Itg' is a one-bit marker defined for representing the presence of connected components to be restored in a partition or the presence of dependent trees. A value of 0 represents the presence of connected components, and a value of 1 represents the absence of connected components. A fixed partitioning method employs one identical partitioning method throughout overall given mesh data using only an arbitrary format among the bitstream formats described in FIGS. 12A through 12I according to application fields.

Figures 12A, 12B, 12C, 12D, 12E:
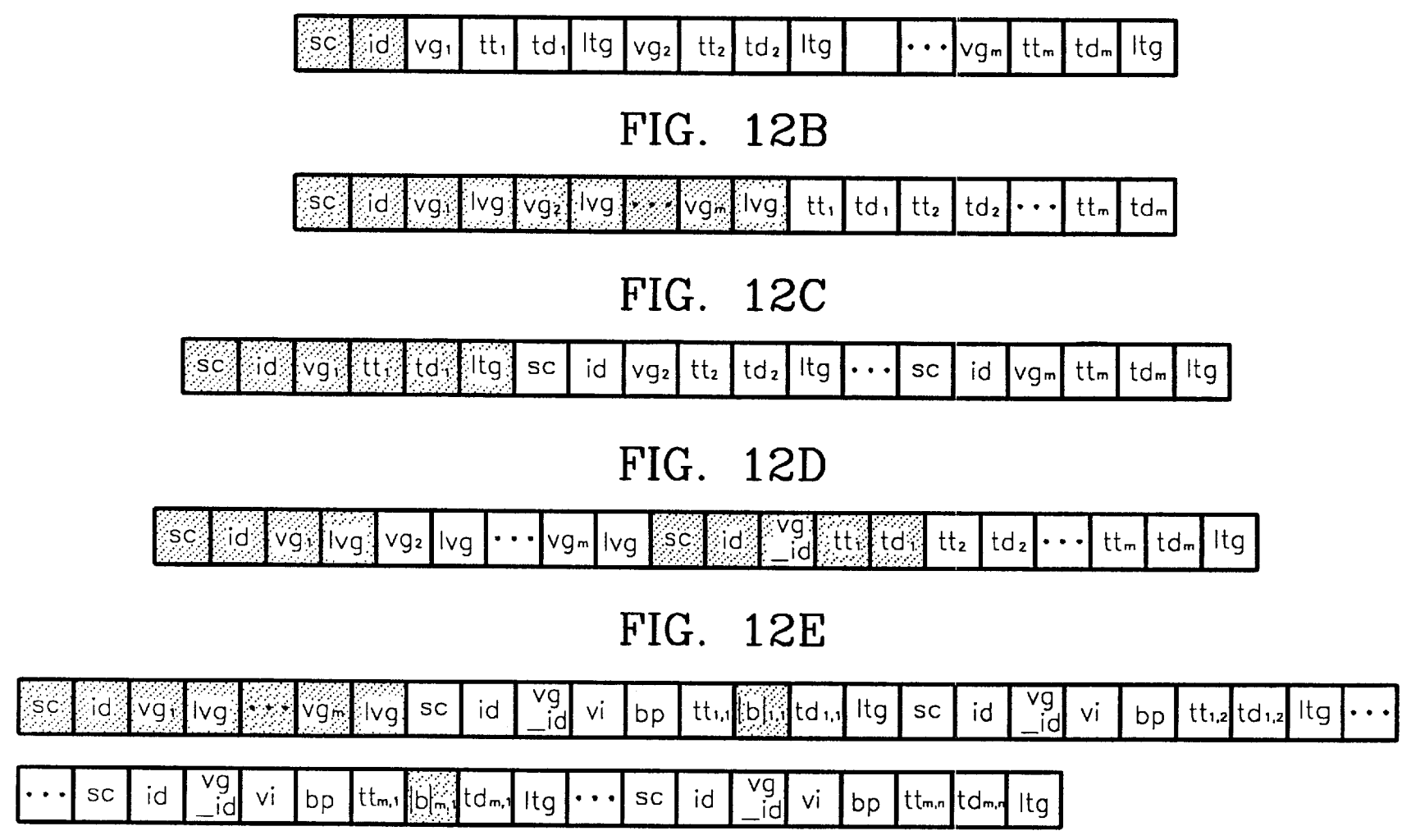
Figures 12F, 12G, 12H, 12I:
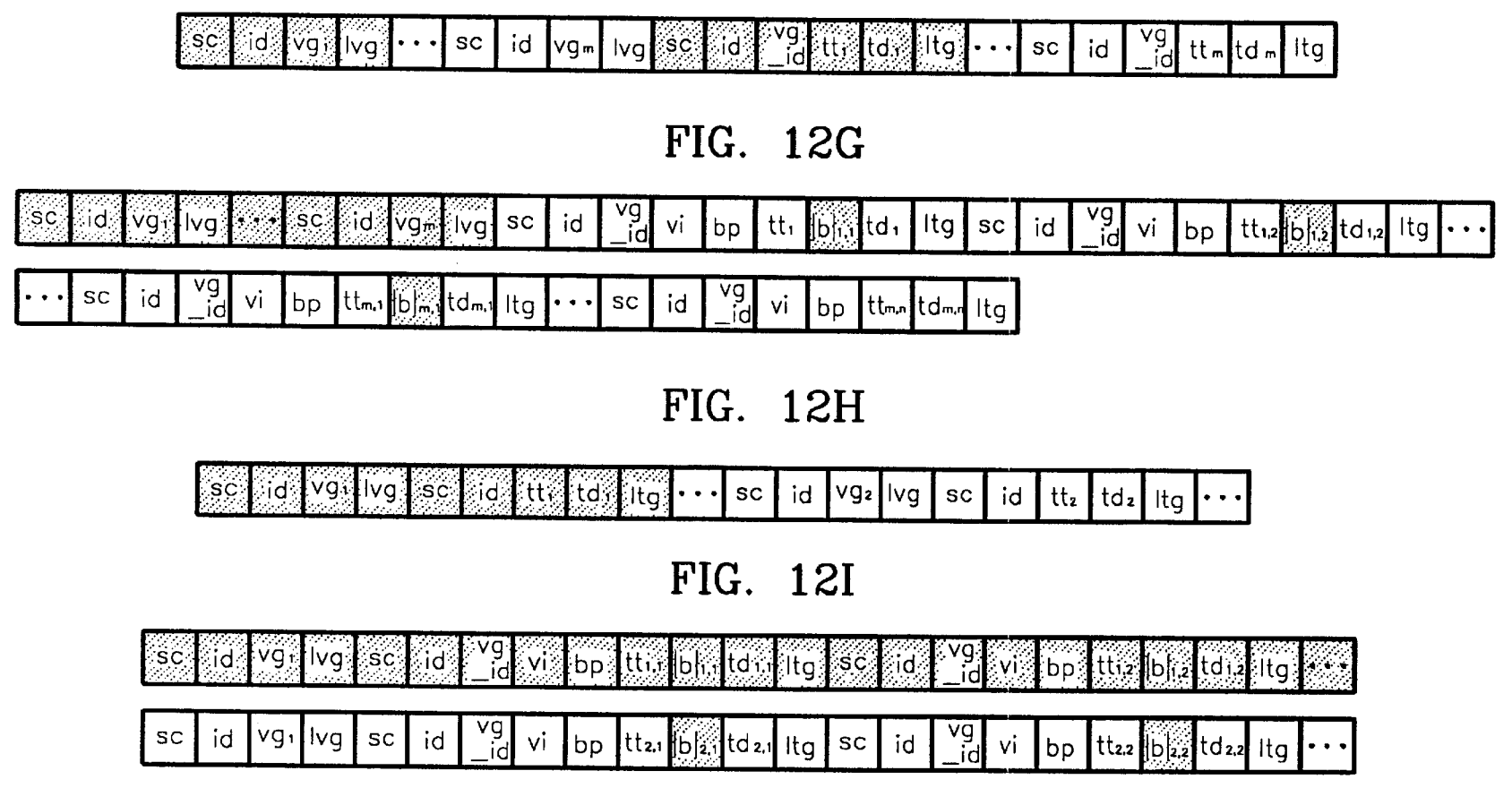

In view of construction, FIG. 12A shows that the overall mesh data are processed in a coding order to form a partition, FIG. 12B shows that the overall mesh data are formed as a partition, while vertex graph data and tt/td pairs are separated, and FIG. 12C shows that a partition is formed by one connected component as a minimum unit. FIG. 12D shows that several vertex graphs constituting mesh data are collected to form a partition, with the tt/td pairs corresponding to the vertex graphs being collected to form a partition. FIG. 12E shows that several vertex graphs constituting mesh data are collected to form a partition and the tt/td pairs constitute several partitions in consideration of the sizes of the partitions. FIG. 12F shows that the vertex graphs and the tt/td pairs are separated and are formed as separate partitions in units of connected components. FIG. 12G shows that several vertex graphs constituting mesh data are formed as separate partitions and the tt/td pairs corresponding to each vertex graph constitute several partitions in consideration of the sizes of the partitions. FIG. 12H shows that the vertex graph constituting each connected component is first formed as a partition and the corresponding tt/td pair is then formed as a partition. FIG. 12I shows that vertex graph data of each connected component is coded into a partition and the corresponding tt/td pair is separated into partitions in consideration of the sizes of the partitions.

In view of function, the partitioning methods shown in FIGS. 12A through 12I will now be described. The methods shown in FIGS. 12A and 12B are used in the case when error resilience is not provided or when there is no restriction in a transmission path and the performance of a decoder. According to the method shown in FIG. 12A, the processing cost is reduced and the rendering efficiency is improved. However, according to this method, the cost caused by retransmission of data in the event of a data error increases. The methods shown in FIGS. 12C, 12D, 12F and 12H can assure independence of partitions. However, according to these methods, it is difficult to be adapted to a packet having a specific size. In other words, if the partition is smaller than the packet in transmitting the data loaded on a packet having a specific size, dummy data corresponding to the difference in size between the partition and the packet must be additionally provided. On the contrary, if the partition is larger than the packet size, the data cannot be made into a packet, the data must be separately processed and additional data must be provided from the decoder. Thus, the overall coding efficiency is lowered and the complexity and cost increase. In the methods shown in FIGS. 12E, 12G and 12I, the vertex graph data for the connectivity of meshes is processed in the same manner as described above. However, the tt/td pair for the construction type of a triangle in a mesh can be processed separately in accordance with the partition size, while assuring the independence thereof. The data including vg_id, vi and bp are additionally provided to the partitions of the tt/td pair. Here, vg_id specifies the vertex graph corresponding to the tt/td pair to be restored, and is used when the vertex graphs are collectively processed, as shown in FIGS. 12D through 12G. vi specifies values of left_index and right_index of a starting triangle of each partition, and is provided for restoring the current partition independently from the previous partition even if the previous partition cannot be restored due to errors. Also, bp is a one-bit marker for defining a coding method of vertex geometry, color, normal and texCoord, for each partition of the tt/td pair. In the methods shown in FIGS. 12E, 12G and 12I, lbl is selectively used only when partitioning the ends of a branching triangle. If the tt/td pair can be coded in units of connected components, as shown in FIGS. 12A through 12D, 12F and 12H, the value of bp is set to '1' with overlapping coding of previously coded vertices being allowed. If the tt/td pair is divided into several parts constituting an arbitrary connected component, as shown in FIGS. 12E, 12G and 12I, bp is independently defined for each partition to be restored.

Itg is selectively coded. That is, if the current partition is the last one of one side branch of the tt/td pair, Itg is coded into '1'; otherwise it is coded into '0'. This is determined using the visiting index as follows:

right_index-lefta_index-1=the number of triangles in the current partition. [Formula 2]

If the above formula is satisfied, which means the end of the branch is reached, Itg is coded into '1'.

Now, data partitioning methods for providing the above-described constructions will be described.

1. Data Partitioning Method in Units of Connected Components

This method is shown in FIGS. 12C and 12H and can be easily implemented. If the size difference between connected components is not great, this method is effective. However, if the data sizes of connected components are not uniform and the difference therebetween is large, redundant bits are generated, which deteriorates the coding efficiency. Also, if the size of one connected component is large, the efficiency is lowered and the data cannot be packetized to have a predetermined size. Therefore, this method can be adopted only when there is no restriction in the transmission path and the performance of a decoder. The methods shown in FIGS. 12A, 12B, 12D and 12F also encounter these disadvantages.

2. Partitioning Method for Combining Small Connected Components

If many connected components whose sizes are small are contained within a model, the above-described partitioning method is not effective. Thus, as shown in FIGS. 12A and 12B, it is desirable that the connected components whose sizes are is small are collected into one component until partitions each having a predetermined size are obtained. According to this method, it is necessary to provide vg_id for defining the tt/td pair corresponding to a specific vertex graph as the header information of a partition.

3. Partitioning Method for Combining Large Connected Components

The first partitioning method can be used in coding large connected components only under restrictive surroundings. To overcome this limitation, the present invention proposes a general coding method by which one large connected component can be partitioned while satisfying both the flexibility in the partition size and independence of partitions, FIGS. 12E, 12G and 12I show coding methods in which only the tt/td pair from an arbitrary large connected component is divided into several partitions to then be coded. FIG. 12E shows a modification of the method shown in FIG. 12D, and FIG. 12I shows a modification of the method shown in FIG. 12H. The methods shown in FIGS. 12E and 12G have a disadvantage in that the cost increases because all of the vertex graph data must be stored in a decoder. Also, the method shown in FIG. 12I is poor in view of the coding efficiency of small connected components.

Also, according to this method, vg_id for defining the tt/td pair corresponding to a specific vertex graph, vi for defining the boundary loop index of a starting triangle of a partition, and bp for indicating a coding method of the data including geometry, color normal and texCoord, must be additionally defined in the partition header information. However, according to this method, the mesh data can be easily protected from data error independently from each other. Also, the coding loss which is caused by partitioning can be reduced.

Figure 13A:
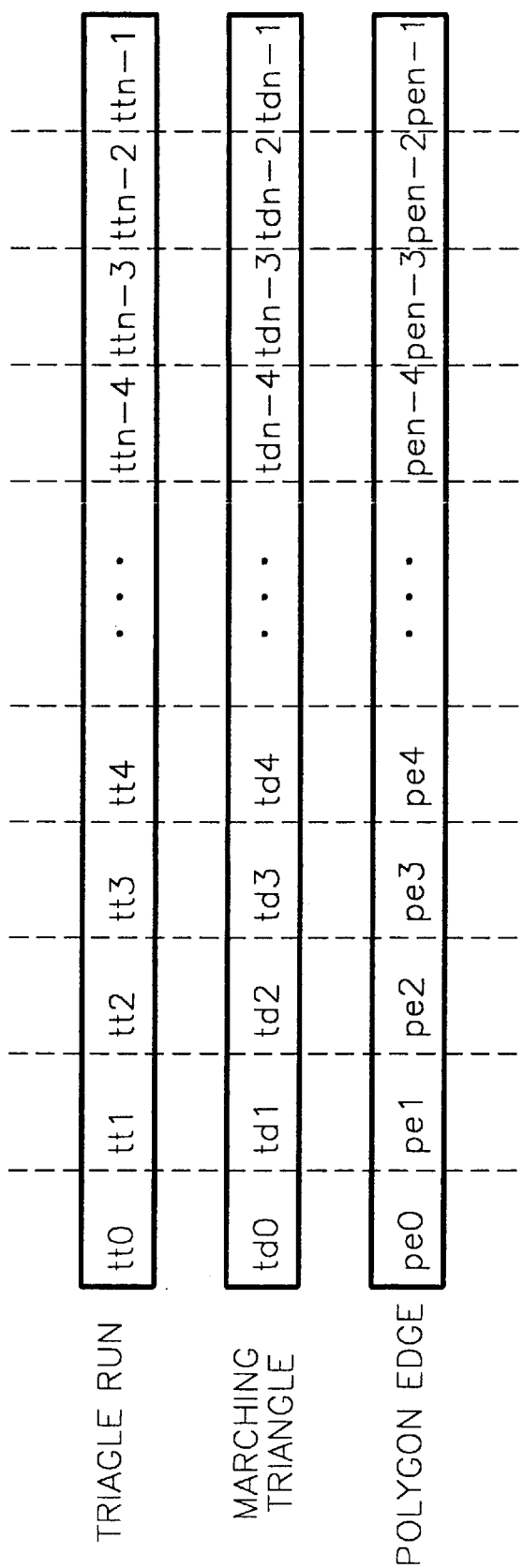
FIGS. 13A and 13B are conceptual diagrams of data partitioning.
Figure 13B:
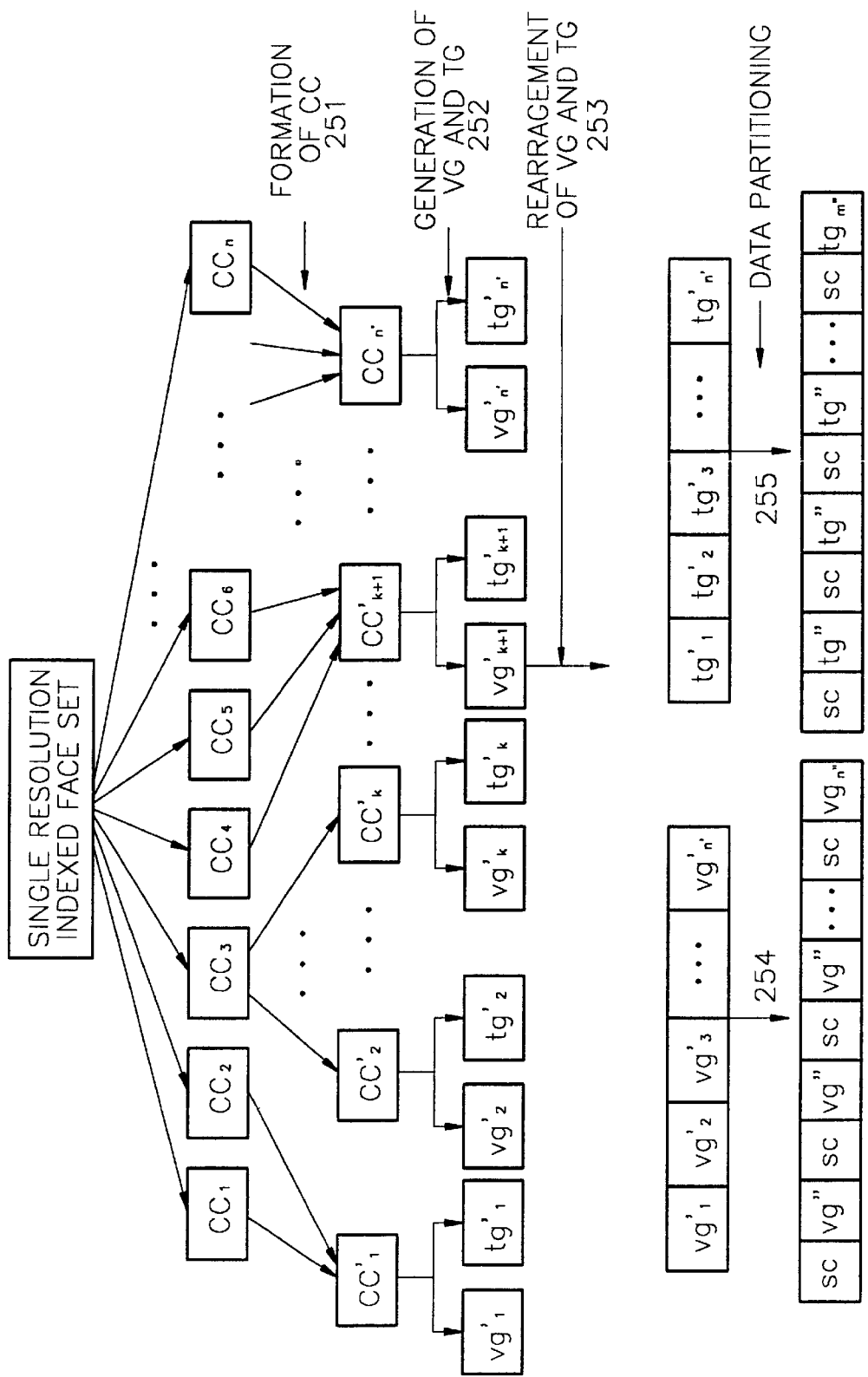

In addition, FIG. 13A shows the structure of bitstreams when the tt/td pairs are separated, in which dotted lines indicate separation positions, illustrating the relationship between triangle tree and triangle data. FIG. 13B illustrates a data partitioning procedure utilizing the above-described partitioning methods. Although 'id' information is not shown in FIG. 13B for convenience's sake, it must come after the start code. 'vg' denotes vertex graph data, 'tt/td' denotes a pair of triangle tree/triangle data, and 'cc' denotes a connected component. In FIG. 13B, the subscript n denotes the number of connected components (CC) and n' denotes the number of reformatted components in the case of reformatting according to the sizes of connected components. The reformatting is performed in the following manner.

1. Reconstruction of Connected Components (Step 251)

Small connected components are combined to be included in the range of a predetermined data partition size. As shown in FIG. 13B, connected components $CC_1$ and $CC_2$ are combined to form reformatted component $CC'_1$. The connected components larger than a predetermined size are partitioned into small components. In FIG. 13B, the third connected component $CC_3$ is partitioned into several components $CC'_2, \ldots, CC'_k$.

2. Generation of Vertex Graphs and Pairs of Triangle Tree/triangle Data (Step 252)

vgs and tt/td pairs are generated for the respective reformatted components.

3. Rearrangement of vg and tt/td Pairs (Step 253)

vgs and tt/td pairs generated in the step 252 are separately rearranged.

4. Partitioning of vg Information (Step 254)

The vg information rearranged in the step 253 is partitioned into units of information having a predetermined size.

5. Partitioning of tt/td Pair Information (Step 255)

The tt/td pair information generated in the step 253 is partitioned into units of information having a predetermined size.

The fixed partitioning method is disadvantageous in view of system complexity and cost since a separate decoder suitable for each of the methods shown in FIGS. 12A through 12I is necessary. Therefore, the present invention proposes a variable partitioning method by which bitstreams based on the above-described methods can be adaptively decoded using a single decoder.

\<Variable Partitioning Method\>

In the variable partitioning method, unlike in the fixed partitioning method, pt (partition type) information, that is, information for defining the partition type of the current partition, is additionally provided. Thus, the partitions are classified into four types, as shown in FIGS. 14A through 14D. pt defined in the present invention is dependent on the value of sc, and the relationship between sc and pt is summarized in Table 1.

TABLE 1

Relationship between sc and pt

| Bit value | Meaning |
|---|---|
| 0000 0000 0011 0001 | One or more of vgs are contained and the vg data is used in one or more other data partitions. |
| 0000 0000 0011 0011 | Only tt/td data is contained. In the case of restoring the data, vg__jd for matching tt/td pair to an arbitray vg, vi (visiting index) which is the starting point of a triangle strip, and bp (boundary predication) are contained in header information. |
| 0000 0000 0011 0100 | vg, tt and td constitute a data partition, and vg is used in another one or more data partitions. |

To perform the variable data partitioning for compensating for the system complexity and cost, the following must be taken into consideration.

A start code cannot be selectively inserted. In other words, a decoder performs a decoding operation without knowing in which mode the current bitstream is coded. Thus, in the case where the start code is selectively supplied in accordance with a coding mode, only limited bitstreams are restored. In some cases, various kinds of decoders must be provided. Accordingly, the cost and complexity may increase. In order to perform decoding irrespective of the coding mode of an encoder, the variable syntax system must be excluded.

In the case of using a specific coding type, unnecessary information may be provided in accordance with the characteristics of mesh data or a decoder, which lowers the coding efficiency.

FIGS. 14A through 14D illustrate four types of syntax modules for supporting the variable partitioning method. FIG. 14C shows the syntax for adaptively providing vg__id and Itg, as defined in FIGS. 12A through 12I. In other words, if only one vg is contained in the syntax shown in FIG. 14B, the relationship between vg and the tt/td pair can be identified during restoration. Thus, vg__id is not necessarily given. Itg is provided only when the partitioned tt/td pair corresponds to the end of one side branch of the overall tt/td pair, and the determination formula therefor is expressed in formula (2). FIG. 14A shows the structure in partition type 0 where a partition is constituted of an arbitrary number of connected components, FIG. 14B shows the structure in partition type 1 where a partition is constituted of an arbitrary number of vg's, FIG. 14C shows the structure in partition type 2 where a partition is constituted of only a tt/td pair corresponding to one connected component, and FIG. 14D shows the structure in partition type 3 where a partition is constituted of vg and the tt/td pair corresponding to the current connected component. Therefore, the combination of these syntax structures can support all types of syntax structures except that shown in FIG. 12B. In other words, the structure shown in FIG. 12A can be implemented in partition type 0, and the structure shown in FIG. 12I can be implemented by combination of partition type 1 and partition type 2. Therefore, in the present invention, for the connected components smaller than packets, several connected components are collected in a partition to be coded in partition type 0, in consideration of the coding efficiency. The larger connected components are coded in partition types 1 and 2 or in partition types 2 and 3. Also, in consideration of the transmission path or the performance of a decoder, various syntax structures combined in various ways can be provided.

Figure 15A:
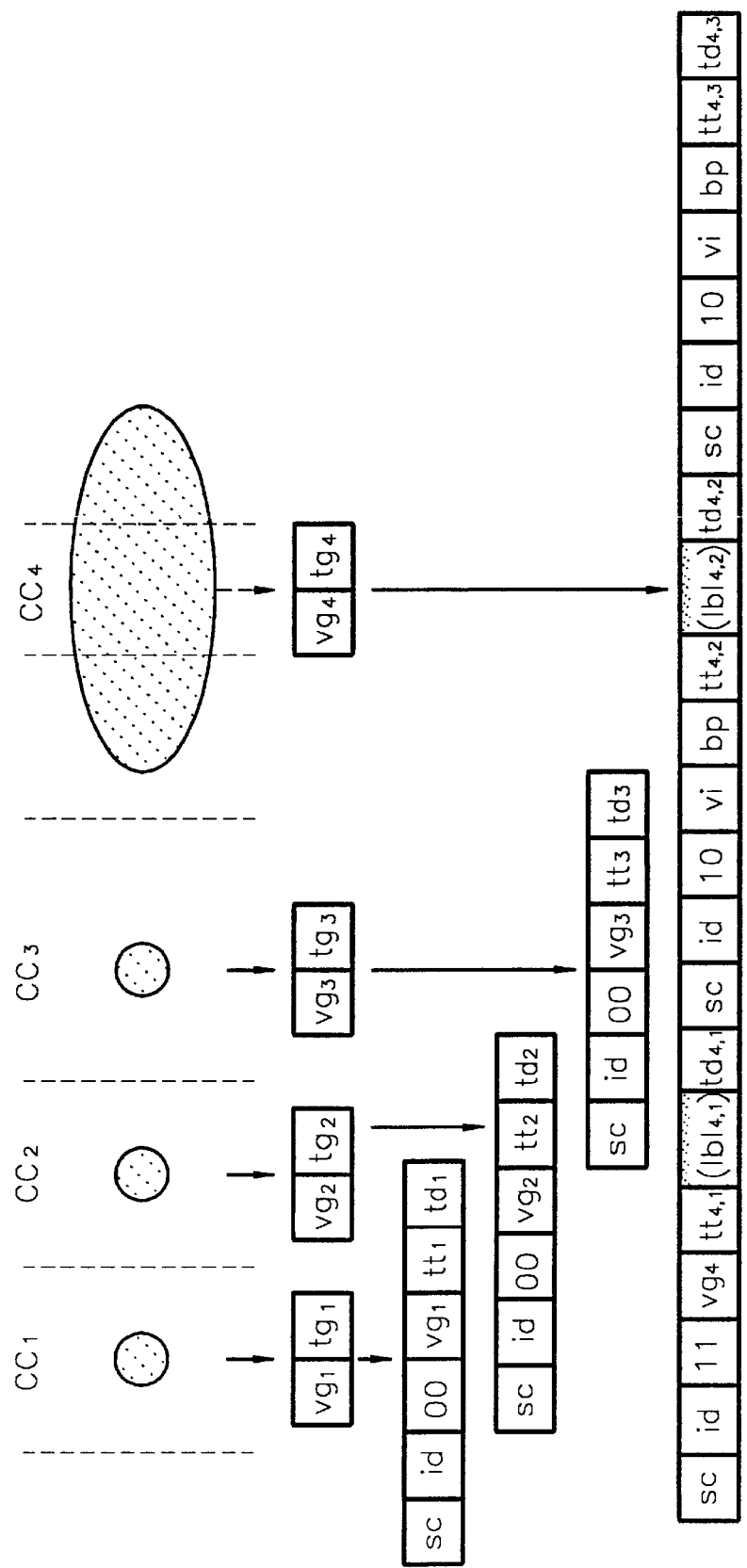
Figures 15B, 15C, 15D:
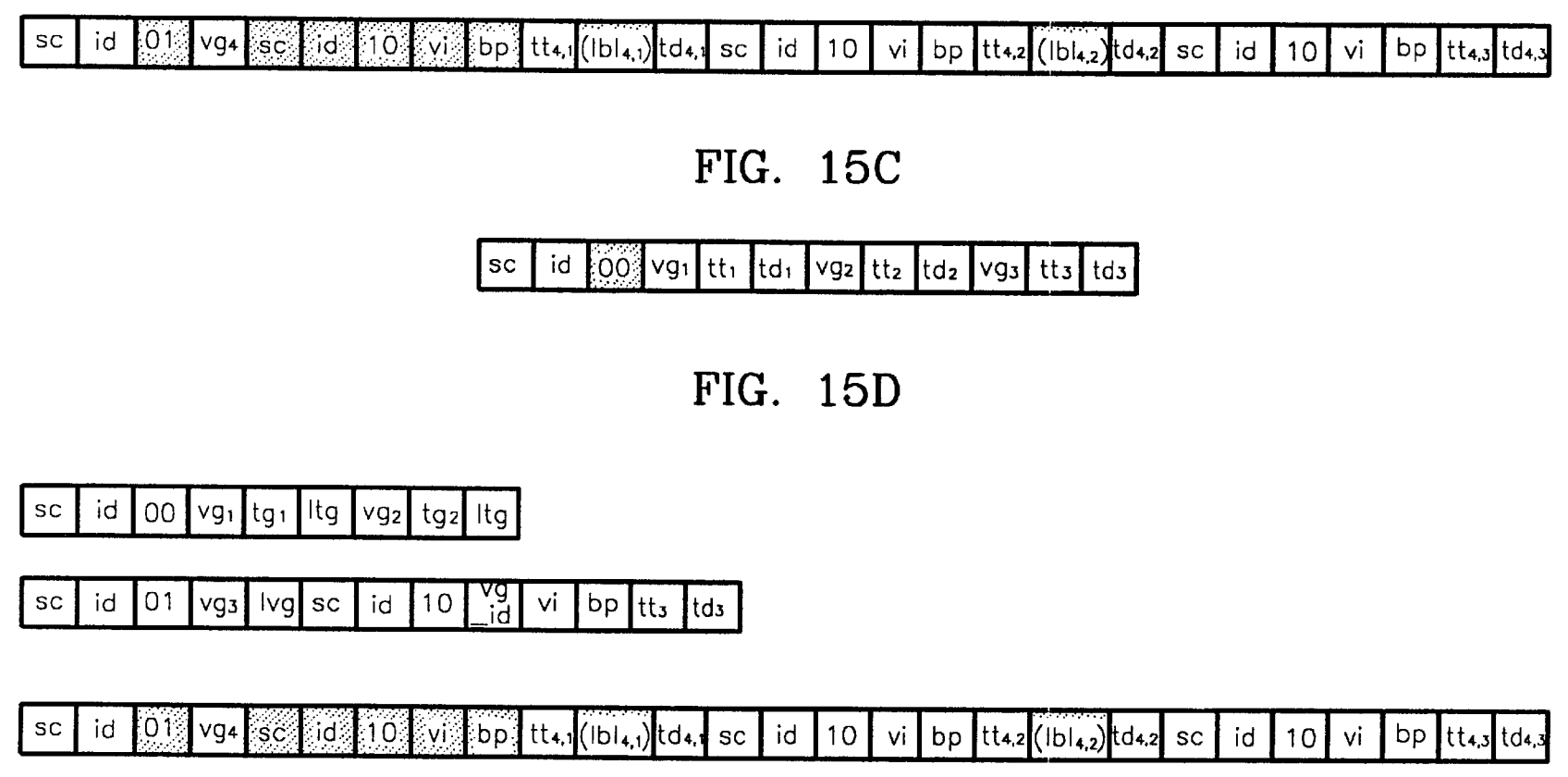

FIGS. 15A through 15D illustrate an example of the variable partitioning method. In FIG. 15A, since cc1 through cc3 are small meshes, they are processed by each connected component, with a partition defined in partition type 0 or 3. Since cc4 is a large mesh, the tt/td pair is divided into several parts to be processed in combination of partition type 3 and partition type 2. Also, the cc4 can be processed in combination of partition type 1 and partition type 2, as shown in FIG. 15B. Also, as shown in FIG. 15C, in order to improve the coding efficiency, the mesh data can be changed into another combined structure. FIG. 15C shows the case that the mesh data of cc1 through cc3 are defined in partition type 0. In order to represent the overall mesh data, the structures shown in FIGS. 15C and 15A or FIGS. 15C and 15B can be combined. However, in order to provide the structure shown in FIG. 15C, conditions for determining the last connected component are necessary. In the conventional method, in order to determine the last connected component, a one-bit marker of last__cc is used. A value of 1 represents the last connected component. Therefore, in the present invention, the presence of a connected component to be restored can be determined using Itg whose function is similar to last__cc and pt information within sc as follows:

| | |
|---|---|
| if (ltg==1) { | |
|   if (pt==0) { | |
|     if (next-2__bytes( )==sc) | The currently restored cc is the last cc in a partition; |
|     else | The currently restored cc is the last partition to be restored; |
|   } else | The currently restored cc is the last cc in a partition; |
| } else | The currently restored cc is not the last cc in a partition; | where next__2__bytes( ) is the function for reading two bytes in advance only among bitstreams in a decoder. FIG. 15D shows an example in partition types 1, 2 and 3. As shown in the above-described example, the variable partitioning method has excellent adaptability to coding surroundings and is better than the fixed partitioning method in view of the coding efficiency and cost.

\<Data Partitioning Method of tt/td Pair\>

Figure 16:
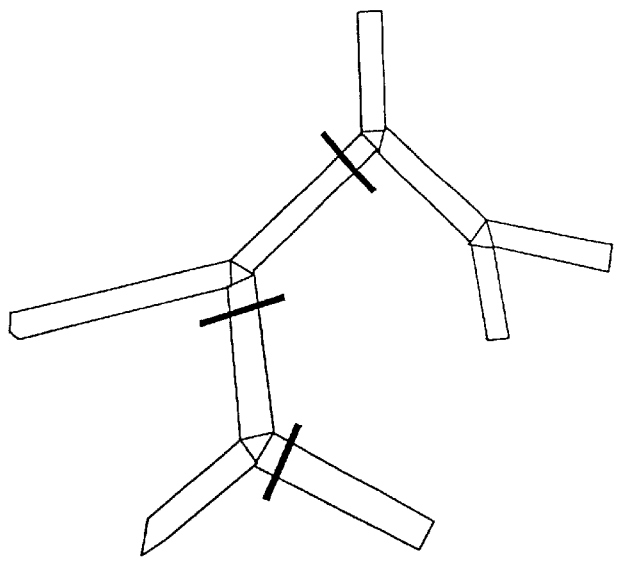
FIG. 16 illustrates data partitioning in a main branch.

In the present invention, partitioning of the tt/td pair is basically performed at the corresponding position after the triangle data of one side branch of a branching triangle occurring first at the end of the previous partition, that is, the main branch, which is shown in FIG. 16. The reason for partitioning the tt/td pair at the main branch is as follows. As described above, if Y-vertex indices are not determined, restoration and rendering of a triangle coming after the corresponding branching triangle cannot be achieved. However, this method may cause ineffectiveness in accordance with the initial traversing order and the actual type of tt/td pair. That is to say, in the case when the left (or right) branch is coded first, if the left branch of a branching triangle of the tt/td pair is very large, it is still larger than the packet. Thus, determination of Y-vertex indices cannot be done until much information coming after the branching triangle, that is, the information on the number of triangles of one branch, is processed.

Therefore, the present invention proposes three effective methods of partitioning mesh data. In the present invention, one or more partitions may be contained in a packet. However, in this chapter, description will be made on the basis that only one partition is contained in a packet.

Figure 17:
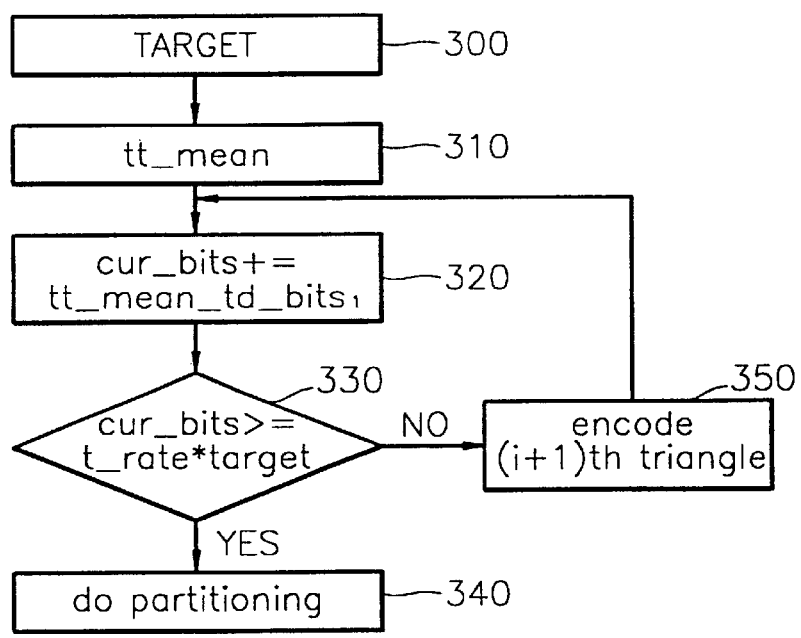
FIG. 17 illustrates a data partitioning method using tt_mean.

A first data partitioning method is to perform partitioning by setting a packet allowance, t_rate, for a packet size, target (300 of FIG. 17). A mean bit generation amount of tt to be coded in units of connected components, that is, tt_mean, is obtained, and then partitioning is performed within the range in which a predetermined packet allowance, t_rate, is satisfied. In FIG. 17, tt_mean is a mean bit amount of tt calculated for each connected component, td_bit$_i$ is a bit generation amount of the data excluding vg and tt, after the i-th triangle is coded, cur_bits is a sum obtained by adding all bits generated from the first through i-th triangles of the packet, that is, tt mean+td_bits$_i$. Therefore, if cur_bits is greater than or equal to t_rate*target (step 330), partitioning is done for coding (step 340). If not, (i+1)-th triangle is coded (step 350). The above-described procedure is repeatedly performed until all meshes are coded, thereby achieving partitioning.

Figure 18A:
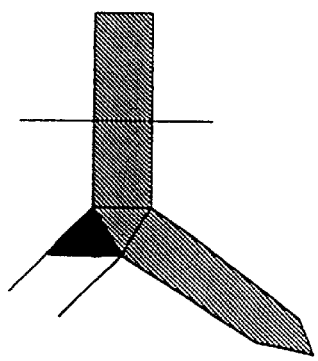
FIGS. 18A through 18C illustrate a method of forming virtual connected components.
Figure 18B:
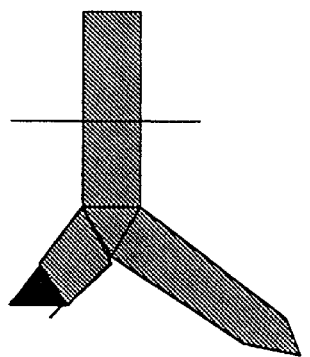
Figure 18C:
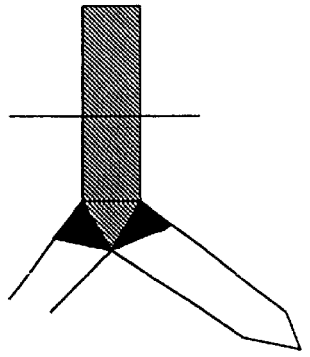

Here, the method of determining partitioning at branching triangles on the main branch must be taken into consideration. That is to say, on the assumption that partitioning position is basically defined only at the main branch for solving the Y-vertex problem, it is necessary to determine whether one dependent tree selected to be decoded next to the branching triangle by orientation information is included within the packet including the branching triangle. To this end, in the present invention, a to-be-coded dependent tree is coded in advance. In other words, if the packet is completely filled with coded data while the dependent tree is coded, the assumption of partitioning at the main branch is contravened. Thus, as shown in FIG. 18C, partitioning is done at the previous branching triangle. If the total bit generation amount obtained until even the dependent tree is coded is smaller than the packet size, as shown in FIG. 18A or 18B, the dependent tree is included in the packet to then be coded.

A second method is to perform partitioning when the next triangle to be coded is a branching triangle and when it is determined that the sum of the predicted bit generation amount of a branching dependent tree and the bit amount generated at the current partition exceeds the packet size, although t_rate is not yet reached. This will now be described in detail.

1. The number of bits coded in the first partition of each connected component, cur_bit, is stored.

2. Even if a target bit is not yet reached, if the next triangle is a branching triangle, the size of the dependent tree of the next triangle, nst, is obtained.

3. The number of vertices of triangles coded in the current partition so far, cur_ng, is obtained.

4. If cur_ng+nst+2>ng, partitioning is done as follows.

(1) If the predicted amount of bits to be generated at the dependent tree is larger than the packet size, partitioning is done inclusive of the next branching triangle. That is to say, if nst+2>ng, partitioning is performed inclusive of the next branching triangle, as shown in FIG. 18C.

(2) Otherwise, partitioning is done at the current triangle.

A third method is to code in advance a packet unit of a mesh to be coded next to calculate the total number of triangles in the case when the packet size requirement is satisfied, and then to construct bitstreams of actual packet units using the information of the number of triangles. The above-described method of determining whether the dependent tree is to be included in a packet or not is also applied to this method.

In partitioning mesh data using this method, the following two points must be additionally considered. First, delay in decoding time is generated due to Y-vertex calculation. Second, independence among partitioned data must be considered. In the present invention, the delay is minimized by setting a virtual connected component as to be described later, and the independence problem is solved by defining orientation information, bounding loop index information and polygon edge information in units of packets.

<Y-vertex Processing Method Using Virtual Connected Component>

In order to process Y-vertices while maintaining independence among partitioned data of tt/td pairs, two methods are used. The simplest method is to transmit the length of the partitioned data and Y-vertex information to a decoder. The other method is to define the partitioned data as virtual connected components in accordance with the characteristics of the tt/td pair. According to the first method, since the lengths of all meshes and the lengths of partitioned meshes are known at the time of decoding, the structure of a mesh to be restored can be predicted. Also, since the Y-vertex information is known, progressive rendering can be achieved. However, the coding efficiency may be lowered due to additional data.

According to the second method in which virtual connected components are defined, the connected components of the tt/td pair are defined as the numbers of branches and leaves, as expressed in the following formula (3). The virtual connected components can be constructed by defining virtual bits in the partitioned mesh data so as to satisfy the formula (3). Here, the starting position of partitioning is made to occur only at the run of the main branch of the binary tree. This is for facilitating the Y-vertex processing. For example, if partitioning is done at a position other than the main branch, the above-described Y-vertex problem is generated so that a necessity for additional data for Y-vertex processing is required or restoration or rendering cannot be performed independently for each partition.

$$\text{number of branches}+1=\text{number of leaves} \qquad \text{[Formula 3]}$$

Virtual bits can be defined in two cases:

1. When partitioning ends at a run or leaf

To satisfy the formula (3), a pair of virtual bits of (1, 1) is added to (trun, tleaf).

2. When partitioning ends at a branch

To satisfy the formula (3), two pairs of virtual bits of (1, 1) are added to (trun, tleaf).

Also, when partitioning ends at a branch and geometry, color, normal and texCoord data are processed for every vertex, the geometry, color, normal and texCoord data for the last triangle which is a branching triangle are not coded. This is because a branching triangle can be restored by the Y-vertex indices determined by the index information of a triangle immediately before partitioning in the current partition and a root triangle of a partition to be coded next. However, if an error is generated at the partition to be coded next, the last branching triangle of the current partition cannot be restored. This problem can be solved by transmitting the total size data (Ibl) of one of the dependent trees of both branches of the branching triangles to a decoder by including the same in the tt/td pair data. This is because it is possible to calculate the Y-vertex indices of the branching triangle using the Ibl value before next partitions being restored. In the case of performing coding per face or corner, since the coding is not dependent on the Y-vertex index data, the coding is performed for either case. FIGS. 18A through 18C are conceptual diagram of virtual connected components. FIG. 18A shows a virtual triangle in the case when partitioning occurs at a leaf, FIG. 18B shows a virtual triangle in the case when partitioning ends at a run, and FIG. 18C shows a virtual triangles in the case when partitioning ends at a branch defined as a virtual triangle(s) indicated by ▲.

In FIG. 18A, if partitioning occurs in a state where a leaf triangle comes immediately after the branching triangle, the tree structure shown in FIG. 18A becomes the same as that shown in FIG. 18C. In this case, the decoder cannot discriminate the structures shown in FIGS. 18A and 18C. Thus, in a coder, partitioning should not occur at a leaf triangle coming immediately after the branching triangle, except the end of a tree branch. By doing so, the decoder can perform decoding with respect to all triangles without information for discriminating the structures shown in FIGS. 18A and 18C.

Thus, the problem that packetizing is not possible in the case of a large dependent tree under the basic assumption that partitioning is done only at a main branch can be solved by constructing the dependent tree of several independent virtual connected components.

Now, a method of determining virtual bits in the case of performing coding by forming the virtual connected component in such a manner, will be described.

1. Determination of the Presence of Virtual Bits in a Run or Leaf

If the formula 4 is satisfied, a virtual bit is present. Otherwise, a virtual bit is not present. If the third triangle from the last one among coded triangles is not a branching triangle, as shown in FIGS. 18A and 18B, and the formula 4 is satisfied, it is determined that only the virtual data of one pair of (1, 1) is generated in (trun, tleaf) and td data is not decoded for the virtual triangle.

$$\text{right\_index-left\_index-1>total number of triangles generated when only tt of the current partition is restored.} \quad \text{[Formula 4]}$$

2. Determination of the Presence of Virtual Bits in a Branch

If partitioning occurs at a branching triangle, as shown in FIG. 18C, two virtual leaf triangles are added. Thus, if the third triangle from the end of the tt data is a branching triangle and the formula 4 is satisfied, the virtual bit data of two pairs of (1, 1) is present in (trun, tleaf). Then, the td data of the last two leaf triangles is not decoded.

<Data Partitioning in Polygonal Mesh>

Figure 19:
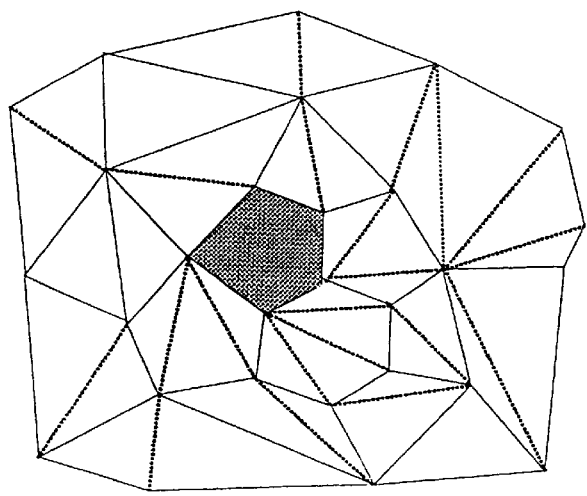
FIG. 19 illustrates an example of transforming a polygonal mesh into a triangular mesh.

In topological surgery, in order to code mesh data comprised of polygons, the polygon data is first reconstructed as triangles. FIG. 19 shows an example of reconstruction of polygonal mesh data as triangle mesh data, in which solid lines indicate actual edges of original polygonal mesh data, and dotted lines indicate virtual edges added for dividing the polygonal mesh into triangles. In order for the decoder to restore the divided triangles into the original polygon, the information for removing the virtual edges must be transmitted to the decoder. This is called polygon edge information. If a piece of polygon edge information is sent per triangle, a value of 1 means an actual edge, and a value of 0 means a virtual edge.

Conventionally, after converting the polygons contained in mesh data into triangle mesh data, the polygon edge information about all triangles except the first triangle is generated. Here, the coder sets the first triangle as an actual edge, and the decoder sets the polygon edge information of the first triangle as 1 and perform restoration.

However, in the case when data partitioning must be performed within a polygon other than a triangle, the mesh data cannot be restored by the conventional method. Accordingly, mesh data partitioning is limited in satisfying the packet size requirement, thereby lowering the coding efficiency.

Figure 20A:
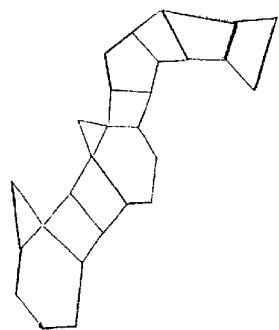
FIGS. 20A through 20E illustrate examples of partitioning in a polygonal mesh and syntaxes thereof.
Figure 20B:
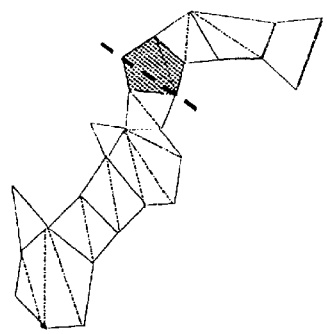
Figure 20C:
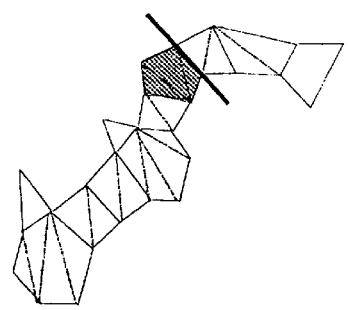
Figure 20D:
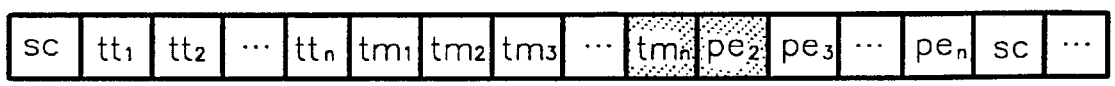
Figure 20E:
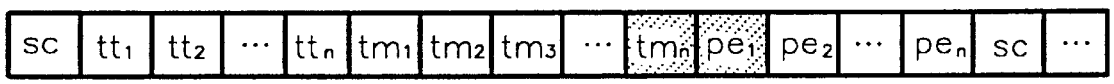

Therefore, in order to solve the above-described problems and disadvantages, it is necessary to define the polygon edge information defined in a partition for the first triangle of the partition in the case when the partition starts at a virtual edge. In FIGS. 20D and 20E, reference character 'tt' denotes triangle run information, 'tm' denotes marching information, 'pe' denotes polygonal edge information, subscripts it denote the order of tm and pe corresponding to tt, and 'n' denotes the number of triangles. FIG. 20D shows syntaxes in the case of partitioning a polygonal mesh at actual edges, corresponding to FIG. 20C, and FIG. 20E shows syntaxes in the case of partitioning a polygonal mesh at virtual edges, corresponding to FIG. 20B.

The present invention is based on the fact that data partitioning is performed at an actual edge, and provides syntaxes which allow restoration even when data partitioning occurs within a polygon.

Polygon edges in each partition are processed based on 'pt' information or 'triangulated' and 'polygon_edge' information as follows.

1. Method of processing polygon_edge based on pt
   (1) When pt=0, the edge value of the first polygon edge within a partition is not coded; and
   (2) Only when pt=2 and one or more polygons are present within a partition, that is, triangulated=0, the edge value of the first polygon edge within a partition is coded.
2. Method of processing polygon_edge based on triangulated and polygon_edge information
   (1) When partitioning at an actual edge is permitted, the value of the first polygon edge within a partition is not coded; and
   (2) When partitioning at a virtual edge is permitted, the value of the first polygon edge within a partition is coded.

Here, discrimination between the actual edge and the virtual edge in an arbitrary polygon is done by the following conditions:

```
if (triangulated==1)         actual edge
else if (polygon_edge==0)    virtual edge
     else                    actual edge
```

Therefore, the decoder decodes the first polygon_edge value unconditionally when triangulated=0. Then, a value of 0 is defined as the value of the first polygon edge, and a value of 1 is defined as the value of the second polygon edge.

The triangulated information is 0 if one or more polygons are present in mesh data within a partition; otherwise it is 1, to construct one-bit information in units of partitions.

<Data Partitioning Based on Orientation Information>

The above-described necessity and definition method of the orientation information is also applicable to data partitioning. However, since partitioning is allowed even at a dependent tree in the case of using virtual connected components, as described above, it is not possible to determine whether the mesh of the current partition to be restored is connected to a main branch or a sub branch when the previous partition cannot be restored due to a data error. Thus, an error in calculating the bounding loop index may be generated, and restoration and rendering cannot be achieved.

Therefore, in the present invention, the orientation information is defined in the virtual connected component in the same manner as that the actual connected component, thereby achieving independent restoration and rendering within the virtual connected component.

<Data Partitioning Including Bounding Loop Information (vi)>

Since the indices of the geometry of actual vertices are mapped into the bounding loop information, the actual coordinate values of the vertices of a triangle can be identified by mapping using the bounding loop indices. Therefore, in the event that a partition with an error is not successfully retransmitted, as shown in FIG. 9, it is not possible to restore partitions to be restored next because the bounding loop index information for a starting triangle in a partition is not known. To avoid such ineffectiveness, the respective data partitions must be independently restored or rendered. To this end, the starting positions of the bounding loop, from which the respective data partitions start, must be given.

During restoration in the decoding part, vg is used for storing the values of the respective vertices of triangles to be restored next in a bounding loop table. Here, the vertex of the next triangle can be determined by increasing/decreasing by 1 the index of the bounding loop table of the index value of a triangle being at a starting position, as shown in FIG. 21. Thus, if the indices of the vertices of the first triangle of a data partition in the bounding loop are determined, the vertices of the remaining triangles to be restored next can be determined by increasing/decreasing the w bounding loop index of the first triangle by 1. Therefore, in the present invention, only the bounding loop indices of the vertices of the first triangle of a partition are given to the corresponding partition, thereby assuring independence of the respective partitions. Also, vi defined in the present invention is comprised of two kinds of index information, that is, left_index and right_index, and the construction of bitstreams therefor is shown in FIG. 22. In FIG. 22, reference character L denotes the index of the first vertex in the bounding loop on the left boundary of a triangle strip, and R denotes the index of the first vertex in the bounding loop on the right boundary of a triangle strip.

When bitstreams are sequentially received from a storage medium such as a compact disc, since indices of the bounding loop range from 0 to a level within a predetermined size for each connected component, the index given to the header portion of the partition must be coded into a value which is within this range, which is allowed because the bounding loop exactly matches the tt/td pair and a tt/td pair is always coded after a vg. However, according to the characteristics of transmission media, the transmission order and the reception order may differ due to a transmission delay. Also, the loss of bitstreams may occur. In such cases, since there is no guarantee that the vg corresponding to the tt/td pair is received properly, an index different from the former index must be given.

FIG. 21 illustrates the relationship between a bounding loop and tt/td pairs in the case of several connected components. Here, the first column shows examples of independently indexing each connected component in the bounding loop and the second column shows examples of indexing the last value of the previous bounding loops being incremented continuously, in the bounding loop.

FIGS. 23A and 23B illustrate a method of coding the start index information of a partition, in which n, represents the size of the bounding loop of the first connected component and $n_2$ represents the size of the bounding loop of the second connected component. In this case, for the partition of the second connected component, the index information is given to the header by two methods as shown in FIGS. 23A and 23B. FIG. 23A illustrates header information of a partition in the case of bounding loop indexing for each connected component, and FIG. 23B illustrates header information of a partition in the case of bounding loop indexing for overall models.

<Data Partitioning Based on Geometry>

Until now, the present invention has been described based on the connectivity of a model in a data partition. Now, a method of assuring the independence between partitions of geometry and improving the coding efficiency will be described. During data partitioning, if the vertices of the respective triangles contact those of a triangle contained in the previous partition, the information on whether the geometry has been already coded or not is necessary, which is defined by a 'visited' marker. A value of 1 indicates that the geometry has already been coded, and a value of 0 indicates that the geometry has not yet been coded. Generally, the geometry used for both the previous partition and the current partition appears at the boundary of two partitions. In the case where the current partition is coded, the geometry appearing at the boundary of the previous partition is defined such that visited=2. In this connection, the geometry coding method in data partitioning is classified as follows.

Firstly, as shown in FIG. 24A, among the geometry information included in the current partition, only the information not visited in the previous partition is coded in the current partition.

Secondly, as shown in FIG. 24B, the information on the boundary coded in the previous partition is also coded in the current partition, thereby restoring the geometry in the current partition independently from the previous partition.

Thirdly, as shown in FIG. 24C, among data coded in the previous partitions, only the geometry connected with several geometries also appearing in the current partition is coded in the current partition.

Fourthly, as shown in FIG. 24D, since the geometry overlapping and appearing in both the previous partition and the current partition generally appears consecutively in a boundary of a triangle strip, one half of the overlapping data is coded in the previous partition and the other half is coded in the current partition.

In FIGS. 24A through 24D, shaded circles denote geometry coded only in the previous partition, black circles denote geometry coded in both the previous partition and the current partition, white circles denote geometry coded in the current partition, and thick, black solid lines denote boundaries between partitions.

However, the above-described methods have the following issues.

Although the first method can be easily implemented, the amount of surrounding data which can be used for prediction for coding the geometry is smaller than that in the other method, which lowers the accuracy of the geometry.

The second method is better than the first method, in view of the accuracy of the geometry. However, according to this method, since the geometry appearing on the boundary is overlapped and coded in two partitions, the coding efficiency is reduced.

The third method can reduce a loss of the geometry while maintaining an appropriate level of compression. However, according to the third method, since the characteristic of the connectivity must be known, it is difficult to implement this method and the complexity increases.

In the fourth method, although the disadvantage of the second method can be solved, a rendering delay is generated. In other words, the first, second and third methods enable restoration and rendering by themselves, and the fourth method enables rendering by generating values omitted in the current partition by interpolation using the surrounding geometry, or requires a standby time for the next partition.

The first or second method is adaptively used in actually partitioning data. In other words, in consideration of the coding efficiency and the independence between partitions, since the traversing information of the partition whose partitioning start and end positions are positioned at a main branch can be exactly known from the previously coded partitions, the partition is partitioned by the first method. In the event when the previous partition cannot be restored due to an error generated in the previous partition, since the traversing information of the partition whose partitioning start and end positions are positioned at a dependent tree cannot be known, the partition is partitioned by the second method. In the present invention, the geometry coding method is provided to the header information of each partition. In the case of adaptively adopting only the first and second methods, a one-bit boundary prediction marker value of 0 means that the first method is used in coding the geometry of a data partition. A value of 1 means that the second method is used in coding the geometry of a data partition. FIG. 24E shows the syntax of the structure in which the boundary prediction marker is contained in the header information.

<Predictive Coding Method of Geometry>

A predictive coding method of a mesh aims at enhancement of the coding efficiency by predicting the geometry of an arbitrary vertex, that is, d, using the geometry of three vertices a, b and c of a previously coded neighboring triangle, that is, d', and coding the difference between an estimated value and an actual value. Such a predictive coding method can be expressed by the formula 5.

$$d' = f(a, b, c) \qquad \text{[Formula 5]}$$

The methods of predicting the geometry are differed depending on the boundary prediction. This is because the use or non-use of three vertices of a neighboring triangle used for prediction is differed depending on the boundary prediction method and thus independent restoration of partitions cannot be assured for each method. Therefore, in the present invention, when the value of boundary prediction is set to '1', that is, when overlapping is allowed, the predictive coding method is used as conventionally using only the visited information of neighboring vertices. Otherwise, when the value of boundary prediction is set to '0', that is, when overlapping is not allowed and predictive coding must be done using only the geometry within a partition, the predictive coding method is performed as expressed in the formula 6:

[Formula 6]
```
if all of a, b and c cannot be used, d'=0
else if only one of a, b and c can be used, d'=t
else if only two of a, b and c can be used, {
    if the distances between two vertices    d'=(t1 +t2)/2
    t1 and t2 and d are 1,
    else if the distance between only one    d'=t1
    vertex t1 and d is 1,
        else                                  d'=t2
} else                                        d'=f(a, b, c)
``` where t denotes an arbitrary available vertex among three vertices a, b and c, and t1 and t2 denote two available vertices among three vertices a, b and c.

<Construction and Processing Method of Bitstreams of Geometry and Photometry>

Figure 25A:
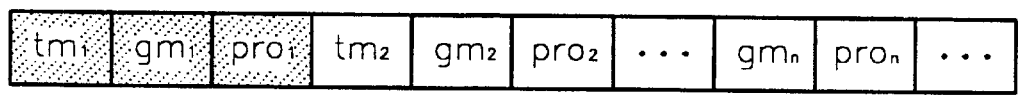
FIGS. 25A and 25B illustrate syntaxes for arranging data such as geometry, color, normal or texCoord information.
Figure 25B:
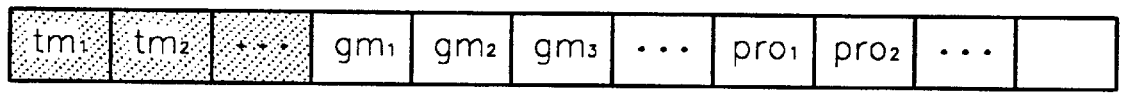
Figure 26:
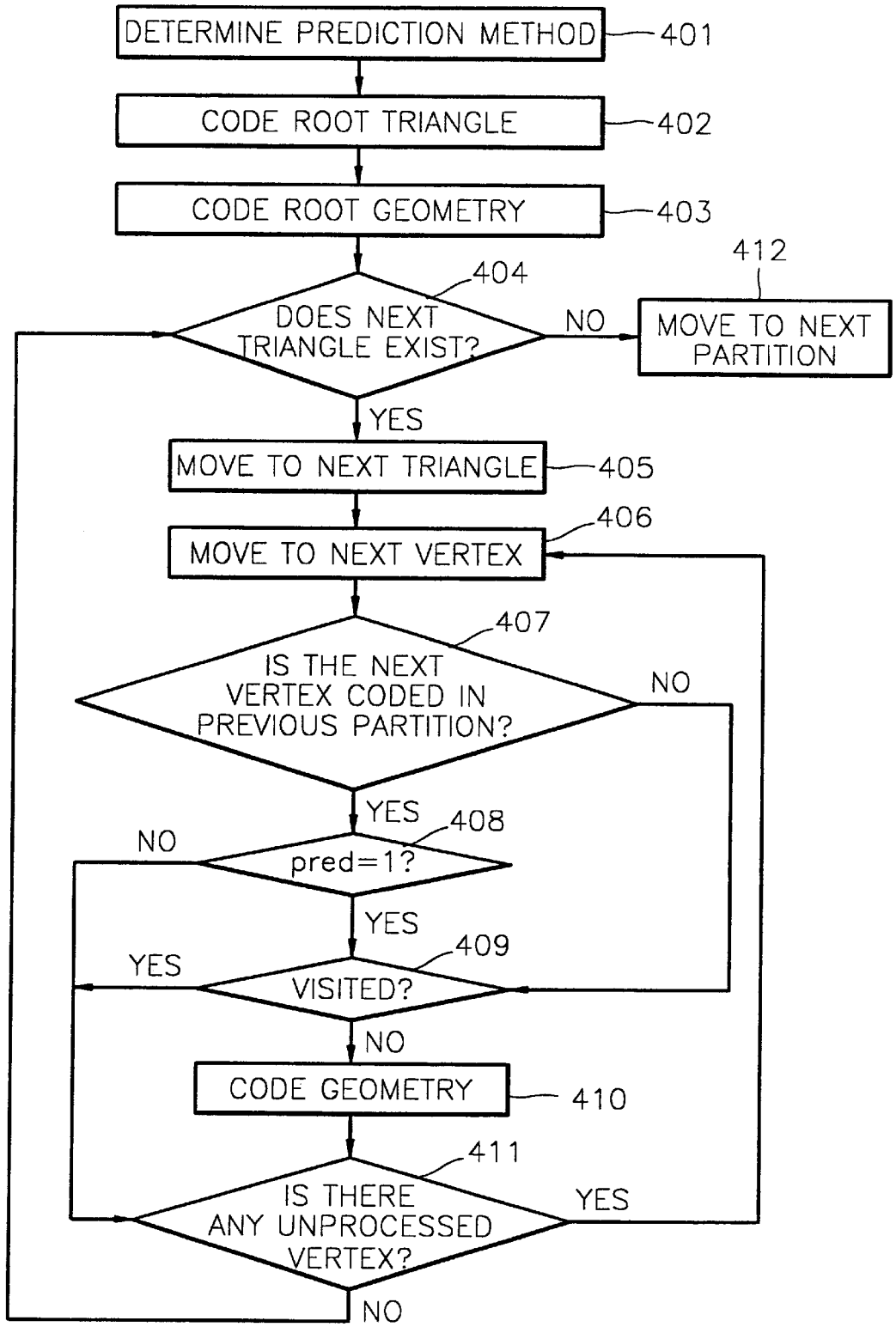
FIG. 26 is a conceptual diagram of a geometry coding method.

The geometry information and the photometry information including color, normal and texture coordinates are coded as follows. First, as shown in FIG. 25A, the related property information is coded for each marching bit of a triangle. According to this method, when marching bits and polygon edge information are restored, triangles can be immediately rendered. Alternatively, as shown in FIG. 25B, the respective properties may be separately coded. FIG. 26 is a flowchart for coding the actual photometry by using the above syntax system. As shown in FIG. 26, the geometry is coded in the combination of the methods shown in FIGS. 24A and 24B, by using the syntax system shown in FIG. 25A.

FIG. 26 is a flow diagram of coding a polygonal 3D model in units of partitions.

1. A boundary prediction method is determined (step 401). In other words, it is determined whether coding is to be performed by the method shown in FIG. 24A or 24B.

2. The first triangle appearing in a partition, the root triangle, is coded (step 402).

3. Root geometry is coded (step 403).

4. If a next triangle exists (step 404), the routine is moved to the next triangle (step 405) and then moved to the next vertex (step 406).

5. It is determined whether each vertex of the triangle is traversed in the previous partition (step 407). If coding is not performed in the previous partition, it is determined whether coding is performed in the current partition (step 409). If not, the vertex is coded (step 410).

6. If the vertex is coded in the previous partition, or the boundary prediction value is 1 (step 408), it is determined whether the vertex is visited (step 409). If not, coding of the vertex is performed (step 410).

7. The steps 405 through 410 are repeated up to the last triangle of the current partition.

Now, the coding syntax for implementing progressive 3D mesh and error resilience will be described.

The compressed bitstream for a 3D polygonal mesh is composed of a header data block with global information, followed by a sequence of connected component data blocks, each one associated with one connected component of the mesh.

| 3D Mesh Header | CC Data #1 | ... | CC Data #nCC |
| --- | --- | --- | --- |

If a 3D mesh is coded in error resilience mode, connected component data blocks are grouped or divided into partitions.

| Partition #1 | Partition #2 | ... | Partition #nPT |
| --- | --- | --- | --- |

Each connected component data block is composed of three records, the vertex graph, the triangle tree record, and the triangle data-record.

| Vertex Graph | Triangle Tree | Triangle Data |
| --- | --- | --- |

The triangle tree record contains the structure of a triangle spanning tree which links all the triangles of the corresponding connected components forming a simple polygon. The polygonal mesh is represented in triangulated form in the bitstream, which also contains the information necessary to reconstruct the original faces. The vertex graph record contains the information necessary to stitch pairs of boundary edges of the simple polygon to reconstruct the original connected component connectivity. The connectivity is categorized as global information (for each connected component) and local information (for each triangle). The global information is stored in the Vertex Graph and Triangle Tree records. The local information is stored in the Triangle Data record.

The triangle data is arranged on a per triangle basis, where the ordering of the triangles is determined by the traversal of the triangle tree.

| Data for triangle #1 | Data for triangle #2 | ... | Data for triangle #n |
|---|---|---|---|

The data for a given triangle is organized as follows:

| marching pattern | td_orientation | polygon_edge | coord | normal | color | texCoord |
|---|---|---|---|---|---|---|

The marching pattern, td_orientation and polygon_edge constitute the per triangle connectivity. The other fields contain information to reconstruct the vertex coordinates (coord) and optionally, normal, color, and texture coordinate (texCoord) information.

| Visual Bitstream Syntax 3D Mesh Object 3D_Mesh_Object | | |
|---|---|---|
| 3D_Mesh_Object ( ) { | No. of bits | Mnemonic |
| 3D_MO_start_code | 16 | uimsbf |
| 3D_Mesh_Object_Header ( ) | | |
| do { | | |
| 3D_Mesh_Object_Layer ( ) | | |
| } while (nextbits_bytealigned ( )==3D_MOL_start_code) | | |
| } | | |

| 3D_Mesh_Object_Header | | |
|---|---|---|
| 3D_Mesh_Object_Header ( ) { | No. of bits | Mnemonic |
| ccw | 1 | bslbf |
| convex | 1 | bslbf |
| solid | 1 | bslbf |
| creaseAngle | 6 | uimsbf |
| coord_header ( ) | | |
| normal_header ( ) | | |
| color_header ( ) | | |
| texCoord_header ( ) | | |
| cgd_data | 1 | bslbf |
| if (cgd_data=='1') | | |
| cgd_header ( ) | | |
| } | | |

| 3D_Mesh_Object_Layer | | |
|---|---|---|
| 3D_Mesh_Object_Layer ( ) { | No. of bits | Mnemonic |
| 3D_MOL_start_code | 16 | uimsbf |
| mol_id | 8 | uimsbf |

-continued

| | No. of bits | Mnemonic |
|---|---|---|
| if (cgd_data=='1') { | | |
| cgd_n_vertices | 24 | uimsbf |
| cgd_n_triangles | 24 | uimsbf |
| cgd_n_edges | 24 | uimsVf |
| } | | |
| if (mol_id==0) | | |
| 3D_Mesh_Object_Base_Layer ( ) | | |
| else | | |
| 3D_Mesh_Object_Refinement_Layer ( ) } | | |

| 3D_Mesh_Object_Base_Layer | | |
|---|---|---|
| 3D_Mesh_Object_Base_Layer ( ) { | No. of bits | Mnemonic |
| do { | | |
| 3D_MOBL_start_code | 16 | uimsbf |
| mobl_id | 8 | uimsbf |
| while (!bytealigned ( ) | | |
| one_bit | 1 | bslbf |
| qf_start ( ) | | |

-continued

| | No. of bits | Mnemonic |
|---|---|---|
| if (3D_MOBL_start_code =="partition_type_0") { | | |
| do { | | |
| connected_component ( ) | | |
| qf_decode (last_component, last_component_context) | | vlclbf |
| } while (last_component=='0') | | |
| } | | |
| else if(3D_MOBL_start_code =="partition_type_1") { | | |
| vg_number=0 | | |
| do { | | |
| vertex_graph ( ) | | |
| vg_number++ | | |
| qf_decode (codap_last_vg, codap_last_vg_context) | | vlclbf |
| } while (codap_last_vg==')') | | |
| } | | |
| else if (3D_MOBL_start_code =="partition_type_2") { | | |
| if (vg_number > 1) | | |
| qf_decode (codap_vg_id, codap_vg_id_context) | | vlclbf |
| qf_decode (codap_left_bloop_idx, codap_left_bloop_idx_context) | | vlclbf |
| qf_decode (codap_right_bloop_idx, codap_right_bloop_idx_context) | | vlclbf |
| qf_decode (codap_bdry_pred, codap_bdry_pred_context) | | vlclbf |
| triangle_tree( ) | | |
| triangle_data( ) | | |
| } | | |
| } while (nexbits_bytealigned ( )==3D_MOBL_start_code) | | |
| } | | |

| coord_header | | |
|---|---|---|
| coord_header( ) { | No. of bits | Mnemonic |
| coord_binding | 2 | uimsbf |
| coord_bbox | 1 | blsbf |

-continued

| | No. of bits | Mnemonic |
|---|---|---|
| if (coord_bbox=='1') { | | |
|     coord_xmin | 32 | blsbf |
|     coord_ymin | 32 | blsbf |
|     coord_zmin | 32 | blsbf |
|     coord_size | 32 | blsbf |
| } | | |
| cord_quant | 5 | uimsbf |
| coord_pred_type | 2 | uimsbf |
| if (coord_pred_type=="tree_pred"\|\| | | |
|   coord_pred_type | | |
| =="parallelogram_predition") { | | |
|     coord_nlambda | 2 | uimsbf |
|     for (i=1;i<coord_nlambda; i++) | | |
|         coord_lambda | 4–35 | simsbf |
|   } | | |
| } | | | normal_header

| normal_header( ) { | No. of bits | Mnemonic |
|---|---|---|
| normal_binding | 2 | uimsbf |
| if (normal_binding !="not_bound") { | | |
|   normal_bbox | 1 | blsbf |
|   normal_quant | 5 | uimsbf |
|   normal_pred_type | 2 | uimsbf |
|   if (normal_pred_type=="tree_prediction"\|\| | | |
|     normal_pred_type == | | |
| "parallelogram_prediction") { | | |
|     normal_nlambda | 2 | uimsbf |
|     for (i=1;i<normal_nlambda; i++) | | |
|         normal_lambda | 4–35 | simsbf |
|     } | | |
|   } | | |
| } | | | color_header

| color_header ( ) { | No. of bits | Mnemonic |
|---|---|---|
| color_binding | 2 | uimsbf |
| if (color_binding!="not_bound") { | | |
|   color_bbox | 1 | blsbf |
|   if (color_bbox=='1') { | | |
|     color_rmin | 32 | blsbf |
|     color_gmin | 32 | blsbf |
|     color_bmin | 32 | blsbf |
|     color_size | 32 | blsbf |
|   } | | |
|   color_quant | 5 | uimsbf |
|   color_pred_type | 2 | uimsbf |
|   if (color_pred_type=="tree_prediction"\|\| | | |
|     color_pred_type == | | |
| "parallelogram_prediction") { | | |
|     color_nlambda | 2 | uimsbf |
|     for (i=1;i<color_nlambda; i++) | | |
|         color_lambda | 4–35 | simsbf |
|     } | | |
|   } | | |
| } | | | texCoord_header

| texCoord_header( ) { | No. of bits | Mnemonic |
|---|---|---|
| texCoord_binding | 2 | uimsbf |
| if (texCoord_binding!="not_bound") { | | |
|   texCoord_bbox | 1 | blsbf |
|   if (texCoord_bbox=='1') { | | |
|     texCoord_umin | 32 | blsbf |
|     texCoord_vmin | 32 | bslbf |
|     texCoord_size | 32 | bslbf |
|   } | | |
|   texCoord_quant | 5 | uimsbf |
|   texCoord_pred_type | 2 | uimsbf |
|   if (texCoord_pred_type | | |
| =="tree_prediction"\|\| | | |
|     texCoord_pred_type == | | |

-continued

| | No. of bits | Mnemonic |
|---|---|---|
| "parallalogram_prediction") { | | |
|   texCoord_nlambda | 2 | uimsbf |
|   for (i=1;i<texCoord_nlambda; i++) | | |
|     texCoord_lambda | 4–35 | simsbf |
|   } | | |
| } | | |
| } | | | cgd_header

| cgd_header( ) { | No. of bits | Mnemonic |
|---|---|---|
| cgd_n_proj_surface_spheres | 4 | uimsbf |
| if (cgd_n_proj_surface_spheres!=0) { | | |
|   cgd_x_coord_center_point | 32 | ieeefl |
|   cgd_y_coord_center_point | 32 | ieeefl |
|   cgd_z_coord_center_point | 32 | ieeefl |
|   cgd_normalized_screen_distance_factor | 8 | uimsbf |
|   for (I=0;i<=cgd_n_proj_surface_spheres; i++) { | | |
|     cgd_radius | 32 | ieeefl |
|     cgd_min_proj_surface | 32 | ieeefl |
|     cgd_n_proj_points | 8 | uimsbf |
|     for (j=0;j<=cgd_n_proj_points; j++) { | | |
|       cgd_sphere_point_coord | 11 | uimsbf |
|       cgd_proj_surface | 32 | ieeefl |
|     } | | |
|   } | | |
| } | | |
| } | | | connected_component

| connected_component( ) { | No. of bits | Mnemonic |
|---|---|---|
| vertex_graph( ) | | |
| qf_decode (has_stitches, has_stitches_context) | | vlclbf |
| if (has_stitches=='1') | | |
|   stitches ( ) | | |
| triangle_tree ( ) | | |
| triangle_data ( ) | | |
| } | | | vertex_graph

| vertex_graph( ) { | No. of bits | Mnemonic |
|---|---|---|
| qf_decode (vg_simple, vg_simple_context) | | vlclbf |
| depth=0 | | |
| code_last='1' | | |
| openloops=0 | | |
| do { | | |
|   do { | | |
|     if (code_last=='1') { | | |
|       qf_decode (vg_last, vg_last_context) | | vlclbf |
|       if (openloops>0) { | | |
|         qf_decode (vg_forward_run, vg_forward_run_context) | | vlclbf |
|         if (vg_forward_run=='0') { | | |
|           openloop- | | |
|           if (openloops>0) | | |
|             qf_decode (vg_loop_index, vg_loop_index_context) | | vlclbf |
|           Break | | |
|         } | | |
|       } | | |
|       qf_decode_(vg_run_length, vg_run_length_context) | | vlclbf |

-continued

| | No. of bits | Mnemonic |
|---|---|---|
| qf_decode (vg_leaf, vg_leaf_context)<br>if (fg_leaf=='1'&&vg_simple=='0') { | | vlclbf |
| qf_decode (vg_loop, vg_loop_context)<br>if (vg_loop=='1')<br>  openloops++<br>}<br>} while (0)<br>if (vg_leaf=='1'&&vg_last=='1'&&code_last=='1')<br>  depth-<br>if (vg_leaf=='0'&&(vg_last=='0'\|\| code_last=='0'))<br>  depth++<br>  code_last=vg_leaf<br>} while (depth >= 0 )<br>} | | vlclbf | stitches

| stitches ( ) { | No. of bits | Mnemonic |
|---|---|---|
| for each vertex in connected_component {<br>  qf_decode (stitch_cmd, stitch_cmd_context)<br>  if (stitch_cmd) {<br>    qf_decode (stitch_pop_or_get, stitch_pop_or_get_context)<br>    if (stitch_pop_or_get=='1') {<br>      qf_decode (stitch_pop, stitch_pop_context)<br>      qf_decode (stitch_stitch_stack_index, stitch_stitch_stack_index_context)<br>      qf_decode (stitch_incr_length, stitch_incr_length_context)<br>      if (stitch_incr_length!=0)<br>        qf_decode (stitch_incr_length_sign, stitch_incr_length_sign_context)<br>      qf_decode (stitch_push, stitch_push_context)<br>      if (total length>0)<br>        qf_decode (stitch_reverse, stitch_reverse_context)<br>    }<br>    else<br>      qf_decode (stitch_length), stitch_length_context)<br>  }<br>}<br>} | | vlclbf<br>vlclbf<br>vlclbf<br>vlclbf<br>vlclbf<br>vlclbf<br>vlclbf<br>vlclbf | triangle_tree

| triangle_tree ( ) { | No. of bits | Mnemonic |
|---|---|---|
| depth = 0<br>ntriangles = 0<br>branch_position = 0<br>do {<br>  qf_decode(tt_run_length, tt_run_length_context)<br>  ntriangles += tt_run_length ( )<br>  qf_decode(tt_leaf, tt_leaf_context)<br>  if (tt_leaf=='1') {<br>    depth-<br>  }<br>  else<br>    branch_position = ntriangles<br>    depth++<br>}while (depth >= 0)<br>if (3D_MOBL_start_code=="parition_type_2")<br>  if (codap_right_bloop_idx-codap_left_bloop_idx-1>ntriangles) {<br>    if (branch_position == ntriangles-2) {<br>      qf_decode(codap_branch_len, | | vlclbf<br>vlclbf<br>vlclbf |

-continued

| | | |
|---|---|---|
| codap_branch_len_context)<br>    ntriangles-=2<br>  }<br>  else<br>    ntriangles-<br>  }<br>} | | | triangle_data

| triangle_data ( ) { | No. of bits | Mnemonic |
|---|---|---|
| qf_decode(triangulated, triangulated_context)<br>depth = 0;<br>root_triangle ( )<br>for (i=1; i<ntriangles; i++) {<br>  triangle (i)<br>} | | vlclbf | root_triangle

| root_triangle ( ) { | No. of bits | Mnemonic |
|---|---|---|
| if (marching_triangle)<br>  qf_decode(marching_pattern, marching_pattern_context[marching_pattern])<br>else {<br>  if (3D_MOBL_start_code=="paratition type_2")<br>    If (tt_leaf=='0'&&depth==0)<br>      qf_decode(td_orientation, td_orientation_context)<br>  if (tt_leaf=='0')<br>    depth++<br>  else<br>    depth-<br>}<br>if (3D_MOBL_start_code=="partition type_2")<br>  if (triangulated=='0')<br>    qf_decode(polygon_edge, polygon_edge_context[polygon_edge])<br>root_coord ( )<br>root_normal ( )<br>root_color ( )<br>root_texCoord ( )<br>} | | vlclbf<br>vlclbf<br>vlclbf |

| root_coord ( ) { | No. of bits | Mnemonic |
|---|---|---|
| if (3D_MOBL_start_code=="partition type_2") {<br>  if visited[vertex_index]==0) {<br>    root_coord_sample ( )<br>    if (visited[vertex_index]==0) {<br>      coord_sample ( )<br>      coord_sample ( )<br>    }<br>  }<br>  else {<br>    root_coord_sample( )<br>    coord_sample( )<br>    coord_sample( )<br>  }<br>} | | |

| root_normal ( ) { | No. of bits | Mnemonic |
|---|---|---|
| if(normal_binding != "not_bound") {<br>  if (3D_MOBL_start_code=="partition type_2") {<br>    if (normal_binding != "bound_per_vertex"\|\|visited[vertex_index]==0) {<br>      root_normal_sample ( )<br>      if (normal_binding != "bound_per_ | | |

-continued

```
face"&&(normal_binding !=
"bound_per_vertex"||visited[vertex_
index]==0)) {
        normal_sample ( )
        normal_sample ( )
      }
    }
    else {
      root_normal_sample ( )
      if (normal_binding != "bound_per_
face") {
        normal_sample ( )
        normal_sample ( )
      }
    }
  }
}
```

| root_color ( ) { | No. of bits | Mnemonic |
|---|---|---|

```
  if (color_binding != "not_bound")
    if (3D_MOBL_start_code=="partition
type_2") {
      if (color_binding !=
"bound_per_vertex"||visited[vertex_
index]==0) {
        root_color_sample( )
        if (color_binding != "bound_per_
face"&&
(color_binding !=
"bound_per_vertex"||visited[vertex_index]==
0)) {
          color_sample ( )
          color_sample ( )
        }
      }
      else
        root_color_sample( )
        if (color_binding != "bound_per_
face") {
          color_sample ( )
          color_sample ( )
        }
      }
    }
}
```

| root_texCoord( ) { | No. of bits | Mnemonic |
|---|---|---|

```
  if (texCoord_binding != "not_bound") {
    if (3D_MOBL_start_code=="partition
type_2") {
      if (texCoord_binding !=
"bound_per_vertex"||visited[vertex_index]==
0) {
        root_texCoord_sample ( )
        if (texCoord_binding !=
"bound_per_vertex"||visited[vertex_index]==
0) {
          texCoord_sample ( )
          texCoord_sample ( )
        }
      }
      else {
        root_texCoord_sample( )
        texCoord_sample( )
        texCoord_sample( )
      }
    }
}
``` triangle

| triangle ( ) { | No. of bits | Mnemonic |
|---|---|---|

```
  if (marching_triangle)
    qf_decode(marching_pattern,                      vlclbf
marching_pattern_context[marching_pattern])
  else{
    if (3D_MOBL_start_code=="partition
type_2")
      if(tt_leaf=='0'&&depth==0)
        qf_decode(td_orientation,                   vlclbf
```

-continued

```
td_orientation_context)
      if(tt_leaf=='0')
        depth++
      else
        depth-
    if (triangulated=='0')
      qf_decode(polygon_edge,                       vlclbf
polygon_edge_context[polygon_edge])
    coord ( )
    normal ( )
    color ( )
    texCoord ( )
}
```

| coord ( ) { | No. of bits | Mnemonic |
|---|---|---|

```
  if (3D_MOBL_start_code=="partition
type_") {
    if (visited[vertex_index]==0)
      if(no_ancestors)
        root_coord_sample( )
      Else
        coord_sample( )
  }
  else {
    if (visited[vertex_index]==0)
      coord_sample( )
  }
}
```

| normal ( ) { | No. of bits | Mnemonic |
|---|---|---|

```
  if (normal_binding == "bound_per_
vertex") {
    if (3D_MOBL_start_code=="partition
type_2") {
      if (visited[vertex_index]==0)
        if (no_ancestors)
          root_normal_sample( )
        else
          normal_sample ( )
    }
    else {
      if (visited[vertex_index]==0
        normal_sample( )
    }
  } else if (normal_binding == "bound_per_
face") {
    if (triangulated=='1'||polygon_edge=='1')
      normal_sample ( )
  } else if (normal_binding == "bound_per_
corner") {
    if (triangulated=='1'||polygon_edge=='1')
      normal_sample ( )
      normal_sample ( )
    }
    normal_sample ( )
  }
}
```

| color ( ) { | No. of bits | Mnemonic |
|---|---|---|

```
  if (color_binding == "bound_per_
vetex") {
    if (3D_MOBL_start_code=="partition
type_2") {
      if (visited[vertex_index]==0)
        if (no_ancestors)
          root_color_sample ( )
        Else
          color_sample ( )
    }
```

-continued
```
    else {
      if (visited[vertex_index]==0)
        color_sample( )
    }
  } else if (color_binding == "bound_per_
face") {
    if (triangulated=='1'||polygon_edge=='1')
      color_sample ( )
  } else if (color_binding == "bound_per_
corner") {
    if (triangulated=='1'||polygon_edge=='1') {
      color_sample ( )
      color_sample ( )
    }
      color_sample ( )
  }
}
```

| texCoord( ) { | No. of bits | Mnemonic |
|---|---|---|

```
  if (texCoord_binding == "bound_per_
vertex") {
    if (3D_MOBL_start_code=="partition
type_2") {
      if (visited[vertex_index]==0)
        if (no_ancestors)
          root_texCoord_sample( )
        else
          texCoord_sample ( )
    }
    else {
      if (visited[vertex_index]==0)
        texCoord_sample ( )
    }
  } else if (texCoord_binding == "bound_
per_corner")
  {
    if (triangulated=='1'||polygon_edge=='1') {
      texCoord_sample ( )
      texCoord_sample ( )
    }
      texCoord_sample ( )
  }
}
```

| root_coord_sample ( ) { | No. of bits | Mnemonic |
|---|---|---|

```
  for (i=0; i<3; i++)
    for (j=0; j<coord_quant; j++)
      qf_decode(coord_bit, zero_context)          vlclbf
}
```

| root_normal_sample( ) { | No. of bits | Mnemonic |
|---|---|---|

```
  for (i=0; j<3; i++)
    for (j=0; j<normal_quant; j++)
      qf_decode(normal_bit, zero_context)         vlclbf
}
```

| root_color_sample( ) { | No. of bits | Mnemonic |
|---|---|---|

```
  for (i=0; i<3; i++)
    for (j=0; j<color_quant; j++)
      qf_decode(color_bit, zero_context)          vlclbf
}
```

| root_texCoord_sample ( ) { | No. of bits | Mnemonic |
|---|---|---|

```
  for (i=0; i<3; i++)
    for (j=0; j<texCoord_quant; j++)
      qf_decode(texCoord_bit, zero_context        vlclbf
}
```

| cord_sample ( ) { | No. of bits | Mnemonic |
|---|---|---|

```
  for (i=0; i<3; i++) {
    j=0
    do {
      qf_decode(coord_leading_bit,                vlclbf
        coord_leading_bit_context[3*j+i])
      j++
    } while (j<coord_quant && coord_
leading_bit=='0')
    if (coord_leading_bit=='1') {
      qf_decode(coord_sign_bit, zero_             vlclbf
context)
      do {
        qf_decode(coord_trailing_bit, zero_       vlclbf
context)
      } while (j<coord_quant)
    }
  }
}
```

| normal_sample ( ) { | No. of bits | Mnemonic |
|---|---|---|

```
  for (i=0; i<1; i++) {
    j=0
    do {
      qf_decode(normal_leading_bit,               vlclbf
normal_leading_bit_context[j])
      j++
    } while(j<normal_quant &&
normal_leading_bit=='0')
    if (normal_leading_bit=='1') {
      qf_decode(normal_sign_bit, zero_            vlclbf
context)
      do {
        qf_decode(normal_trailing_bit, zero_      vlclbf
context)
      } while (j<normal_quant)
    }
  }
}
```

| color_sample ( ) { | No. of bits | Mnemonic |
|---|---|---|

```
  for (i=0; i<3; i++) {
    j=0
    do {
      qf_decode(color_leading_bit,                vlclbf
color_leading_bit_context[3*j+i])
      j++
    } while (j<color_quant && color_
leading_bit=='0')
    if (color_leading_bit=='1') {
      qf_decode(color_sign_bit,                   vlclbf
zero_context)
      do {
        qf_decode(color_trailing_bit, zero_       vlclbf
context)
      } while (j<color_quant)
    }
  }
}
```

| texCoord_sample ( ) { | No. of bits | Mnemonic |
|---|---|---|

```
  for (i=0; i<1; i++) {
    j=0
    do {
      qf_decode(texCoord_leading_bit,             vlclbf
texCoord_leading_bit_context[2*j+i])
      j++
    } while (j<texCoord_quant &&
texCoord_leading_bit=='0')
    if (texCoord_leading_bit=='1') {
      qf_decode(texCoord_sign_bit, zero_          vlclbf
context)
      do {
        qf_decode(texCoord_trailing_bit,          vlclbf
zero_context)
      } while (j<texCoord_quant)
    }
  }
}
```

3D Mesh Object_Refinement_Layer

| 3D Mesh Object_Refinement_Layer( ) { | No. of bits | Mnemonic |
|---|---|---|
| do { | | |
|   3D_MORL_start_code | 16 | uimsbf |
|   morl_id | 8 | uimsbf |
|   connectivity_update | 2 | uimsbf |
|   pre_smoothing | 1 | bslbf |
|   if (pre_smoothing=='1') | | |
|     pre_smoothing_parameters( ) | | |
|   post_smoothing | 1 | bslbf |
|   if (post_smoothing=='1') | | |
|     post_smoothing_parameters( ) | | |
|   while (!bytealigned( )) | | |
|     one_bit | 1 | bslbf |
|   qf_start( ) | | |
|   if (connectivity_update=="fs_update") | | |
|     fs_pre_update( ) | | |
|   if (pre_smoothing=='1'\|\|post_smoothing=='1') | | |
|     smoothing_constraints( ) | | |
|   /*apply pre smoothing step*/ | | |
|   if (connectivity_update=="fs_update") | | |
|     fs_post_update( ) | | |
|   if (connectivity_update=="not_updated") | | |
|     qf_decode(other_update, zero_context) | | vlclbf |
|   if (connectivity_update=="not_updated") \|\|other_update=='1') | | |
|     other_property_update( ) | | |
|   /*apply post smoothing step*/ | | |
| } while (nextbits_bytealigned( )==3D_MORL_start_code) | | |
| } | | | pre_smoothing_parameters

| pre_smoothing_parameters( ) { | No. of bits | Mnemonic |
|---|---|---|
| pre_smoothing_n | 8 | uimsbf |
| pre_smoothing_lambda | 32 | ieeefl |
| pre_smoothing_mu | 32 | ieeefl |
| } | | | post_smoothing_parameters

| post_smoothing_parameters( ) { | No. of bits | Mnemonic |
|---|---|---|
| post_smoothing_n | 8 | uimsbf |
| post_smoothing_lambda | 32 | ieeefl |
| post_smoothing_mu | 32 | ieeefl |
| } | | | fs_pre_update

| fs_pre_update( ) { | No. of bits | Mnemonic |
|---|---|---|
| for each connected component { | | |
|   forest( ) | | |
|   for each tree in forest { | | |
|     triangle_tree( ) | | |
|     /*for each tree loop vertex set visited[vertex_index]='1'*/ | | |
|     triangle_data( ) | | |
|   } | | |
| } | | |
| } | | |

| forest( ) { | No. of bits | Mnemonic |
|---|---|---|
| for each edge in connected component | | |
|   if (creates no loop in forest) | | |
|     qf_decode(pfs_forest_edge, pfs_forest_edge_context) | | vlclbf |
| } | | | smoothing_constraints

| smoothing_constraints( ) { | No. of bits | Mnemonic |
|---|---|---|
| qf_decode(smooth_with_sharp_edges, zero_context) | | vlclbf |
| if (smooth_with_sharp_edges=='1') | | |
|   sharp_edge_marks( ) | | |
| qf_decode(smooth_with_fixed_vertices, zero_context) | | vlclbf |
| if (smooth_with_fixed_vertices=='1') | | |
|   fixed_vertex_marks( ) | | |
| } | | |

| sharp_edge_marks( ) { | No. of bits | Mnemonic |
|---|---|---|
| for each edge | | |
|   qf_decode (smooth_sharp_edge, smooth_sharp_edge_context) | | vlclbf |
| } | | |

| fixed_vertex_marks( ) { | No. of bits | Mnemonic |
|---|---|---|
| for each vertex | | |
|   qf_decode (smooth_fixed_vertex, smooth_fixed_vertex_context) | | vlclbf |
| } | | | fs_post_update

| fs_post_update( ) { | No. of bits | Mnemonic |
|---|---|---|
| for each connected component { | | |
|   for each tree in forest | | |
|     tree_loop_property_update( ) | | |
| } | | |

| tree_loop_property_update( ) { | No. of bits | Mnemonic |
|---|---|---|
| loop_coord_update( ) | | |
| loop_normal_update( ) | | |
| loop_color_update( ) | | |
| loop_texCoord_update( ) | | |
| } | | |

| loop_coord_update( ) { | No. of bits | Mnemonic |
|---|---|---|
| for each tree loop vertex | | |
|   coord_sample( ) | | |
| } | | |

| loop_normal_update( ) { | No. of bits | Mnemonic |
|---|---|---|
| if (normal_binding=="bound_per_vertex") { | | |
|   for each tree loop vertex | | |
|     normal_sample( ) | | |
| } | | |
| else if (normal_binding=="bound_per_face") { | | |
|   for each tree loop face | | |
|     normal_sample( ) | | |
| } | | |
| else if (normal_binding=="bound_per_corner") { | | |
|   for each tree loop corner | | |
|     normal_sample( ) | | |
| } | | |
| } | | |

| loop_color_update( ) { | No. of bits | Mnemonic |
|---|---|---|
| if (color_binding=="bound_per_vertex") { | | |
|   for each tree loop vertex | | |
|     color_sample( ) | | |
| } | | |

```
else if (color_binding=="bound_per_
face") {
    for each tree loop face
        color_sample( )
}
else if (color_binding=="bound_per_
corner") {
    for each tree loop corner
        color_sample( )
}
}
```

| loop_texCoord_update( ) { | No. of bits | Mnemonic |
|---|---|---|

```
if (texCoord_binding=="bound_per_
vertex") {
    for each tree loop vertex
        texCoord_sample( )
}
else if (texCoord_binding=="bound_per_
corner") {
    for each tree loop corner
        texCoord_sample( )
}
}
```

| other_property_update | | |
|---|---|---|
| other_property_update( ) { | No. of bits | Mnemonic |

```
    other_coord_update( )
    other_normal_update( )
    other_color_update( )
    other_texCoord_update( )
}
```

| other_coord_update( ) { | No. of bits | Mnemonic |
|---|---|---|

```
for each vertex in mesh
    if (vertex is not a tree loop vertex)
        coord_sample( )
}
```

| other_normal_update( ) { | No. of bits | Mnemonic |
|---|---|---|

```
if (normal_binding=="bound_per_
vertex") {
    for each vertex in mesh
        if (vertex is not a tree loop vertex)
            normal_sample( )
}
else if (normal_binding=="bound_per_
face") {
    for each face in mesh
        if (face is not a tree loop face)
            normal_sample( )
}
else if (normal binding=="bound_per_
corner") {
    for each corner in mesh
        if (corner is not a tree loop corner)
            normal_sample( )
}
}
```

| other_color_update( ) { | No. of bits | Mnemonic |
|---|---|---|

```
if (color_binding=="bound_per_
vertex") {
    for each vertex in mesh
        if (vertex is not a tree loop vertex)
            color_sample( )
}
else if (color_binding=="bound_per_
face") {
    for each face in mesh
        if (face is not a tree loop face)
            color_sample( )
}
else if (color_binding=="bound_per_
corner") {
    for each corner in mesh
        if (corner is not a tree loop corner)
            color_sample( )
}
}
```

| other_texCoord_update( ) { | No. of bits | Mnemonic |
|---|---|---|

```
if (texCoord_binding=="bound_per_
vertex") {
    for each vertex in mesh
        if (vertex is not a tree loop vertex)
            texCoord_sample( )
}
else if (texCoord_binding=="bound_per_
corner") {
    for each corner in mesh
        if (corner is not a tree loop corner)
            texCoord_sample( )
}
}
```

3D_Mesh_Object

MO_start_code: This is a unique 16-bit code that is used for the purpose of synchronization. The value of this code is always '00000 0000010 0000'.

3D_Mesh_Object_Layer 3D_MOL_start_code: This is a unique 16-bit code that is used for the purpose of synchronization. The value of this code is always '0000 0000 0011 0000'.

mol_id: this 8-bit unsigned integer specifies a unique id for the mesh object layer. A value of 0 indicates a base layer, and a value larger than 0 indicates a refinement layer. The first 3D_Mesh_Ojbect_Layer immediately after a 3D_Mesh_Object_Header must have mold_id=0, and subsequent 3D Mesh_Object_Layer's within the same 3D_Mesh_Object must have mold_id>0.

cgd_n_vertices: This is the number of vertices in the current resolution of the 3D mesh. Used to support computational graceful degradation.

cgd_n_triangles: This is the number of triangles in the current resolution of the 3D mesh. Used to support computational graceful degradation.

cgd_n_edges: This is the number of edges in the current resolution of the 3D mesh. Used to support computational graceful degradation.

3D_Mesh_Object_Base_Layer

3D_MOBL_start_code: This is a code of length 16 that is used for the purpose of synchronization. It also indicates three different partition types for error resilience.

TABLE 2

Definition of partition type information

| 3D_MOBL_start code | Partition type | Meaning |
|---|---|---|
| '0000 0000 0011 0001' | Partition_type_0 | One or more groups of vg, tt and td |
| '0000 0000 0011 0011' | Partition_type_1 | One or more vgs |
| '0000 0000 0011 0100' | Partition_type_2 | One pair of tt and td | mobl_id: This 8-bit unsigned integer specifies a unique id for the mesh object component.

one_bit: This boolean value is always true. This one bit is used for byte alignment.

last_component: This boolean value indicates if there are more connected components to be decoded. If last_ component is '1', then the last component has been decoded. Otherwise, there are more components to be decoded. This field is arithmetically coded.

codap_last_vg: This boolean value indicates if the current vg is the last one in the partition. The value is false if there are more vgs to be decoded in the partition.

codap_vg_id: This unsigned integer indicates the id of the vertex graph corresponding to the current tt/td pair in partition_type_2. The length of this value is a log scaled value of the vg_number of vg decoded from the previous partition_type_1. If there is only one vg in the previous partition_type_1, codap_vg_id is not used.

Codap_left_bloop_idx: This unsigned integer indicates the left starting index, within the bounding loop table of a connected component, for the triangles that are to be reconstructed in a partition. The length of this value is the log scaled value of the size of the bounding loop table.

Codap_right_bloop_idx: This unsigned integer indicates the right starting index, within the bounding loop table of a connected component, for the triangles that are to be reconstructed in a partition. The length of this value is the log scaled value of the size of the bounding loop table.

codap_bdry_pred: This boolean flag denotes how to predict geometry and photometry information that are in common with two or more partitions. If codap_bdry_pred is '1', the restricted boundary prediction mode is used, otherwise, the extended boundary prediction mode is used.

3D_Mesh_Object_Header ccw: This boolean value indicates if the vertex ordering of the decoded faces follows a counter clockwise order.

convex: This boolean value indicates if the model is convex.

solid: This boolean value indicates if the model is a solid.

creaseAngle: This 6-bit unsigned integer indicates the crease angle.

coord_header coord_binding: This 2-bit unsigned integer indicates the binding of vertex coordinates to the 3D mesh. The only admissible value for coord_binding is '01'.

coord_bbox: This boolean value indicates whether a bounding box is provided for the geometry. If no bounding box is provided, a default bounding box is used.

coord_xmin, coord_ymin and coord_zmin: These floating point values indicate the lower left corner of the bounding box in which the geometry lies.

coord_size: This floating point value indicates the size of the bounding box.

coord_quant: This 5-bit unsigned integer indicates the quantization step used for geometry.

coord_pred_type: This 2-bit unsigned integer indicates the type of prediction used to reconstruct the vertex coordinates of the mesh. Table 3 shows the admissible values for coord_pred_type.

TABLE 3

Admissible values for coord_pred_type

| coord_pred_type | prediction type |
|---|---|
| 00 | no prediction |
| 01 | forbidden |
| 10 | parallelogram prediction |
| 11 | reserved | coord_nlambda: This 2-bit unsigned integer indicates the number of ancestors used to predict geometry. The only admissible value of coord_nlambda is 3. Table 4 shows admissible values as a function of normal_pred_type.

TABLE 4

Admissible values for coord_nlambda as a function of coord_pred_type

| coord_pred_type | coord_nlambda |
|---|---|
| 00 | not coded |
| 10 | 3 | coord_lambda: This unsigned integer indicates the weight given to an ancestor for prediction. The number of bits used for this field is equal to coord_quant+3.

normal_header normal_binding: This 2-bit unsigned integer indicates the binding of normals to the 3D mesh. The admissible values are described in Table 5.

TABLE 5

Admissible values for normal_binding

| normal_binding | binding |
|---|---|
| 00 | not_bound |
| 01 | bound_per_vertex |
| 10 | bound_per_face |
| 11 | bound_per_corner | normal_bbox: This boolean value should always be false ('0').

normal_quant: This 5-bit unsigned integer indicates the quantization step used for normals.

normal_pred_type: This 2-bit unsigned integer indicates how normal values are predicted.

TABLE 6

Admissible values for normal_pred_type

| normal_pred_type | prediction type |
|---|---|
| 00 | no prediction |
| 01 | tree prediction |
| 10 | parallelogram prediction |
| 11 | reserved |

TABLE 7

Admissible combinations for normal_binding and normal_pred_type

| normal_binding | normal_pred_type |
|---|---|
| 00 | not_coded |
| 01 | no prediction, parallelogram prediction |
| 10 | no prediction, tree prediction |
| 11 | no prediction, tree prediction | normal_nlambda: This 2-bit unsigned integer indicates the number of ancestors used to predict normals. Admissible values of normal_nlambda are 1, 2 and 3. Table 8 shows admissible values as a function of normal_pred_type.

TABLE 8

Admissible values for normal_nlambda as a function of normal_pred_type

| normal_pred_type | normal_nlambda |
|---|---|
| no_prediction | not coded |
| tree_prediction | 1, 2, 3 |
| Parallelogram_prediction | 3 | normal_lambda: This unsigned integer indicates the weight given to an ancestor for prediction. The number of bits used for this field is equal to normal_quant+3.

color_header color_binding: This 2-bit unsigned integer indicates the binding of colors to the 3D mesh. The admissible values are described in Table 9.

TABLE 9

Admissible values for color_binding

| color_binding | binding |
|---|---|
| 00 | not_bound |
| 01 | bound_per_vertex |
| 10 | bound_per_face |
| 11 | bound_per_corner | color_bbox: This boolean value indicates if a bounding box for colors is given. color_rmin, color_gmin and color_bmin: These 3 floating point values give the position of the lower left corner of the bounding box in RGB space.

color_size: This floating point value gives the size of the color bounding box.

color_quant: This 5-bit unsigned integer indicates the quantization step used for colors.

color_pred_type: This 2-bit unsigned integer indicates how colors are predicted.

TABLE 10

Admissible values for color_pred_type

| color_pred_type | prediction type |
|---|---|
| 00 | no prediction |
| 01 | tree prediction |
| 10 | parallelogram prediction |
| 11 | reserved |

TABLE 11

Admissible values for color_binding and color_pred_type

| color_binding | color_pred_type |
|---|---|
| not_bound | not coded |
| bound_per_vertex | no_prediction, parallogram_prediction |
| bound_per_face | no_prediction, tree_prediction |
| bound_per_corner | no_prediction, tree_prediction | color_nlambda: This 2-bit unsigned integer indicates the number of ancestors used to predict colors. Admissible values of color_nlambda are 1, 2 and 3. Table 12 shows admissible values as a function of color_pred_type.

TABLE 12

Admissible values for color_nlambda as a function of color_prediction_type

| color_pred_type | color_nlambda |
|---|---|
| no_prediction | not coded |
| tree_prediction | 1, 2, 3 |
| parallelogram_prediction | 3 | color_lambda: This unsigned integer indicates the weight given to an ancestor for prediction. The number of bits used for this field is equal to color_quant+3.

texCoord_header texCoord_binding: This 2-bit unsigned integer indicates the binding of textures to the 3D mesh. The admissible values are described in Table 13.

TABLE 13

Admissible values for texCoord_binding

| texCoord_binding | binding |
|---|---|
| 00 | not coded |
| 01 | bound_per_vertex |
| 10 | forbidden |
| 11 | bound_per_corner | texCoord_bbox: This boolean value indicates if a bounding box for texture coordinates is given.

texCoord_umin and texCoord_vmin: These 2 floating point values give the position of the lower left corner of the bounding box in 2D space.

texCoord_size: This floating point value gives the size of the texture bounding box.

texCoord_quant: This 5-bit unsigned integer indicates the quantization step used for texture coordinates.

texCoord_pred_type: This 2-bit unsigned integer indicates how colors are predicted. Table 14 shows admissible values for texCoord_pred_type and Table 15 shows admissible values as a function of texCoord_binding.

TABLE 14

Admissible values for texCoord_pred_type

| texCoord_pred_type | prediction type |
|---|---|
| 00 | no_prediction |
| 01 | forbidden |
| 10 | parallelogram prediction |
| 11 | reserved |

TABLE 15

Admissible combinations of texCoord_binding and texCoord_pred_type

| texCoord_binding | texCoord_pred_type |
|---|---|
| not_bound | not coded |
| bound_per_vertex | no prediction, parallelogram prediction |
| bound_per_corner | no prediction, tree prediction | texCoord_nlambda: This 2-bit unsigned integer indicates the number of ancestors used to predict texture coordinates. Admissible values of texCoord_nlambda are 1, 2 and 3.

Table 16 shows admissible values for texCoord_nlambda as a function of texCoord_pred_type.

TABLE 16

Admissible values for texCoord_nlambda as a function of texCoord_pred_type

| texCoord_pred_type | texCoord_nlambda |
|---|---|
| no_prediction | not coded |
| tree_prediction | 1, 2, 3 |
| parallelogram_prediction | 3 | texCoord_lambda: This unsigned integer indicates the weight given to an ancestor for prediction. The number of bits used for this field is equal to texCoord_quant+3.

Cgd_header cgd_n_proj_surface_spheres is the number of Projected Surface Spheres. Typically, this number is equal to 1.

cgd_x_coord_center_point is the x-coordinate of the center point (typically the gravity point of the object) of the projected surface sphere.

cgd_y_coord_center_point is the y-coordinate of the center point (typically the gravity point of the object) of the projected surface sphere.

cgd_z_coord_center_point is the z-coordinate of the center point (typically the gravity point of the object) of the projected surface sphere.

cgd_normalized_screen_distance_factor indicates where the virtual screen is placed, compared to the radius of the projected surface sphere. The distance between the center point of the projected surface sphere and the virtual screen is equal to cgd_radius (cgd_normalized_screen_distance_factor+1). Note that cgd_radius is specified for each projected surface sphere, while cgd_normalized_screen_distance_factor is specified only once.

cgd_radius is the radius of the projected surface sphere.

cgd_min_proj_surface is the minimal projected surface value on the corresponding projected surface sphere. This value is often (but not necessarily) equal to one of the cgd_proj_surface values.

cgd_n_proj_points is the number of points on the projected surface sphere in which the projected surface will be transmitted. For all other points, the projected surface is determined by linear interpolation. cgd_n_proj_points is typically small (e.g., 20) for the first projected surface sphere and very small (e.g., 3) for additional projected surface spheres.

cgd_sphere_point_coord indicates the index of the point position in an octahedron.

cgd_proj_surface is the projected surface in the point specified by cgd_sphere_point_coord.

vertex_graph vg_simple: This boolean value indicates if the current vertex graph is simple. A simple vertex graph does not contain any loops. This field is arithmetically coded.

vg_last: This boolean value indicates if the current run is the last run starting from the current branching vertex. This field is not coded for the first run of each branching vertex, i.e., when the skip_last variable is true. When not coded the value of vg_last for the current vertex run is considered to be false. This field is arithmetically coded.

vg_forward_run: This boolean value indicates if the current run is a new run. If it is not a new run, it must be a run previously traversed, indicating a loop in the graph. This field is arithmetically coded.

vg_loop_index: This unsigned integer indicates the index of a run to which the it current loop connects to. Its unary representation is arithmetically coded. If the variable openloops is equal to vg_loop_index, the trailing '1' in the unary representation is omitted.

TABLE 17

Unary representation of the vg_loop_index field

| vg_loop_index | unary representation |
|---|---|
| 0 | 81 |
| 1 | 01 |
| 2 | 001 |
| 3 | 0001 |
| 4 | 00001 |
| 5 | 000001 |
| 6 | 0000001 |
| ... | |
| openloop-1 | openloop-1 0's | vg_run_length: This unsigned integer indicates the length of the current vertex run. Its unary representation is arithmetically coded.

TABLE 18

Unary representation of the vg_run_length field

| vg_run_length | unary representation |
|---|---|
| 1 | 1 |
| 2 | 01 |
| 3 | 001 |
| 4 | 0001 |
| 5 | 00001 |
| 6 | 000001 |
| 7 | 0000001 |
| 8 | 00000001 |
| n | n-1 0's followed by 1 | vg_leaf: This boolean flag indicates if the last vertex of the current run is a leaf vertex. If it is not a leaf vertex, it is a branching vertex. This field is arithmetically coded.

vg_loop: This boolean flag indicates if the leaf of the current run connects to a branching vertex of the graph, indicating a loop. This field is arithmetically coded.

triangle_tree branch_position: This integer variable is used to store the last branching triangle in a partition.

tt_run_length: This unsigned integer indicates the length of the current triangle run. Its unary representation is arithmetically coded.

TABLE 19

Unary representation of the tt_run_length field

| tt_run_length | unary representation |
|---|---|
| 1 | 1 |
| 2 | 01 |
| 3 | 001 |
| 4 | 0001 |
| 5 | 00001 |
| 6 | 000001 |
| 7 | 0000001 |
| 8 | 00000001 |
| n | n-1 0's followed by 1 | tt_leaf: This boolean flag indicates if the last triangle of the current run is a leaf triangle. If it is not a leaf triangle, it is a branching triangle. This field is arithmetically coded.

triangulated: This boolean value indicates if the current component contains triangles only. This field is arithmetically coded.

marching_triangle: This boolean value is determined by the position of the triangle in the triangle tree. If the value marching_triangle is 0, the triangle is a leaf or branching triangle. Otherwise, the triangle is a run.

marching_pattern: This boolean flag indicates the marching pattern of edges inside a triangle run. A '0' stands for a march to the left, and a '1' for a march to the right. This field is arithmetically coded.

polygon_edge: This boolean flag indicates whether the base of the current triangle is an edge that should be kept when reconstructing the 3D mesh object. If the base of the current triangle is not to be kept, the edge is discarded. This field is arithmetically coded.

codap_branch_len: This unsigned integer indicates the length of the next branch to be traversed. The length of this value is the log scaled value of the size of the bounding loop table.

triangle td_orientation: This one-bit flag informs the decoder the traversal order of tt/td pairs at a branch. This field is arithmetically coded. Table 20 shows admissible values for td_orientation.

TABLE 20

Admissible values for td_orientation

| td_orientation | traversal order |
| --- | --- |
| 0 | right branch first |
| 1 | left branch first | visited: This variable indicates if the current vertex has been visited or not. When codap_bdry_pred is '1', visited is true for the vertices visited in the current partition. However, when codap_bdry_pred is '0', visited is true for the vertices visited in the previous partitions as well as the current partition.

vertex_index: This variable indicates the index of the current vertex in the vertex array.

no_ancestors: This boolean variable is true if there are no ancestors to use for prediction of the current vertex.

coord_bit: This boolean value indicates the value of a geometry bit. This field is arithmetically coded.

coord_heading_bit: This boolean value indicates the value of a heading geometry bit. This field is arithmetically coded.

coord_sign_bit: This boolean value indicates the sign of a geometry sample. This field is arithmetically coded.

coord_trailing_bit: This boolean value indicates the value of a trailing geometry bit. This field is arithmetically coded.

normal_bit: This boolean value indicates the value of a normal bit. This field is arithmetically coded.

normal_leading_bit: This boolean value indicates the value of a leading normal bit. This field is arithmetically coded.

normal_sign_bit: This boolean value indicates the sign of a normal sample. This field is arithmetically coded.

normal_trailing_bit: This boolean value indicates the value of a normal trailing bit. This field is arithmetically coded.

color_bit: This boolean value indicates the value of a color bit. This field is arithmetically coded.

color_leading_bit: This boolean value indicates the value of a leading color bit. This field is arithmetically coded.

color_sign_bit: This boolean sign of a color sample. This field is arithmetically coded.

color_trailing_bit: This boolean value indicates the value of a trailing color bit. This field is arithmetically coded.

texCoord_bit: This boolean value indicates the value of a texture bit. This field is arithmetically coded.

texCoord_leading_bit: This boolean value indicates the value of a leading texture bit. This field is arithmetically coded.

texCoord_sign_bit: This boolean value indicates the sign of a texture sample. This field is arithmetically coded.

texCoord_trailing_bit: This boolean value indicates the value of a trailing texture bit. This field is arithmetically coded.

3D_Mesh_Object_Refinement_Layer

3D_MORL_start_code: This is a unique code of 16 bits in length that is used for synchronization. The value of this code is always '0000 0000 0011 0010'.

morl_id: This 8-bit unsigned integer specifies a unique id for the forest split component.

connectivity_update: This 2-bit variable indicates whether the forest split operation results in a refinement of the connectivity of the mesh or not.

TABLE 21

Values for connectivity_update

| Connectivity_update | Meaning |
| --- | --- |
| 00 | not_updated |
| 01 | fs_update |
| 10 | reserved |
| 11 | reserved | pre_smoothing: This boolean value indicates whether the current forest split operation uses a pre-smoothing step to globally predict vertex positions.

post_smoothing: This boolean value indicates whether the current forest split operation uses a post-smoothing step to remove quantization artifacts.

stuffing_bit: This boolean value is always true.

other_update: This boolean value indicates whether updates for vertex coordinates and properties associated with faces and corners not incident to any tree of the forest follow in the bitstream or not.

pre_smoothing_parameters pre_smoothing_n: This integer value indicates the number of iterations of the pre-smoothing filter.

pre_smoothing_lambda: This floating point value is the first parameter of the pre-smoothing filter.

pre_smoothing_mu: This floating point value is the second parameter of the pre-smoothing filter.

post_smoothing_parameters post_smoothing_n: This integer value indicates the number of iterations of the post-smoothing filter.

post_smoothing_lambda: This floating point value is the first parameter of the post-smoothing filter.

post_smoothing_mu: This floating point value is the second parameter of the post-smoothing filter.

fs_pre_update pfs_forest_edge: This boolean value indicates if an edge should be added to the forest built so far.

smoothing constraints smooth_with_sharp_edges: This boolean value indicates if data is included in the bitstream to mark smoothing discontinuity edges or not. If smooth_with_sharp_edges==0, no edge is marked as a smoothing discontinuity edge. If smoothing discontinuity edges are marked, then both the pre-smoothing and post-smoothing filters take them into account.

smooth_with_fixed_vertices: This boolean value indicates if data is included in the bitstream to mark vertices which do not move during the smoothing process. If smooth_with_sharp_edges==0 all vertices are not allowed to move. If fixed vertices are marked, then both the pre-smoothing and post-smoothing filters take them into account.

smooth_sharp_edge: This boolean value indicates if a corresponding edge is marked as a smoothing discontinuity edge.

smooth_fixed_vertex: This boolean value indicates if a corresponding vertex is marked as a fixed vertex or not.

According to the present invention, firstly, even if a transmission error is generated, only the portion having the error is transmitted again, thereby reducing the network load and transmission time. Secondly, a selected part of data can be progressively restored by using the connectivity, geometry and photometry thereof.

What is claimed is:

1. A method of coding a polygonal three dimensional (3D) mesh object (MO) comprising the steps of:
   (a) dividing the polygonal 3D MO into one or more connected components;
   (b) generating a vertex graph and triangle tree/triangle data for each of the connected components; and
   (c) reconstructing the vertex graph and triangle tree/triangle data constituting the connected component in conformity with mesh object base layers (MOBLs) each capable of being independently decoded for the respective connected components and then coding the same.

2. The coding method according to claim 1, wherein the step (a) comprises the steps of classifying, the polygonal 3D MO into a plurality of mesh object layers (MOLs) and partitioning the classified polygonal 3D MO into one or more connected components.

3. The coding method according to claim 1, wherein in the step (c), if the triangle tree/triangle data constituting the connected components is so large that it does not conform to the MOBLs, the triangle tree/triangle data is partitioned into data partitions each capable of being independently decoded in conformity with the MOBLs, and if the information constituting a plurality of connected components is conformable to the MOBLs, the information constituting a plurality of connected components is collected into one data partition to then be coded in conformity with the MOBLs.

4. The coding method according to claim 1, wherein the MOBLs into which the triangle tree/triangle data is coded includes a one-bit orientation marker at a position where a branching triangle positioned at the main branch of the triangle tree exists, and the traversing order of dependent trees following after the branching triangle is determined by the orientation marked in the orientation marker.

5. The coding method according to claim 4, wherein the orientation marker (td_orientation) is determined by the size information of dependent trees following after the branching triangle.

6. The coding method according to claim 5, wherein all of the dependent trees are in the same traversing order.

7. The coding method according to claim 5, wherein the traversing order of a triangle within the dependent trees corresponds to the value of the orientation marker (td_orientation).

8. The coding method according to claim 1, wherein the MOBLs into which the triangle tree/triangle data is coded includes total size information (codap_branch_len) of a dependent tree positioned at one side branch in a branching triangle positioned at the main branch of the triangle tree, and the Y-vertex indices are determined by the total size information.

9. A progressive and error-resilient method of coding a polygonal three dimensional (3D) mesh object (MO), comprising the steps:
   (a) dividing the polygonal 3D MO into one or more connected components;
   (b) generating a vertex graph and a pair of triangle tree/triangle data for each of the connected components; and
   (c) coding the vertex graph and triangle tree/triangle data constituting the connected components in conformity with mesh object base layers (MOBLs) each having a fixed type of bitstream capable of being independently decoded for the respective connected components.

10. The progressive and error-resilient coding method according to claim 9, wherein in the step (c), the vertex graph and the triangle tree/triangle data are sequentially arranged with respect to all connected components constituting the polygonal 3D mesh to constitute a data partition.

11. The progressive and error-resilient coding method according to claim 9, wherein in the step (c), the vertex graph corresponding to all connected components constituting the polygonal 3D mesh is first arranged and the triangle tree/triangle data corresponding to all connected components is then arranged to constitute a data partition.

12. The progressive and error-resilient coding method according to claim 9, wherein the information constituting the respective connected components is constructed as independent data partitions to then be coded.

13. The progressive and error-resilient coding method according to claim 9, wherein in the step (c), the vertex graph corresponding to all connected components constituting the polygonal 3D mesh is constructed as a data partition and the triangle tree/triangle data corresponding to all connected components is constructed as another data partition, to then be coded.

14. The progressive and error-resilient coding method according to claim 9, wherein in the step (c), the vertex graph corresponding to all connected components constituting the polygonal 3D mesh is constructed as a data partition and the triangle tree/triangle data corresponding to all connected components is constructed as independent data partitions, the triangle tree/triangle data being partitioned into a plurality of data partitions capable of being independently decoded, to then be coded.

15. The progressive and error-resilient coding method according to claim 9, wherein in the step (c), the vertex graphs corresponding to the respective connected components constituting the polygonal 3D mesh are constructed independently as data partitions and the triangle tree/triangle data corresponding to the respective connected components are constituted independently as data partitions, to then be coded.

16. The progressive and error-resilient coding method according to claim 9, wherein in the step (c), the vertex graphs corresponding to the respective connected components are constructed as independent data partitions to then be coded first, and the triangle tree/triangle data corresponding to the respective connected components are constructed as independent data partitions, the triangle tree/triangle data of a connected component larger than the transmission packet being partitioned into a plurality of data partitions capable of being independently decoded, to then be coded next.

17. The progressive and error-resilient coding method according to claim 9, wherein in the step (c), an independent data partition is constructed by the vertex graph corresponding to a connected component and an independent data partition is constructed by the triangle tree/triangle data corresponding to the connected component, to then be coded by the respective connected components.

18. The progressive and error-resilient coding method according to claim 9, wherein in the step (c), an independent data partition is constructed for the vertex graph corresponding to a connected component and an independent data partition is constructed for the triangle tree/triangle data corresponding to a connected component, to then be coded, the triangle tree/triangle data of a connected component larger than the transmission packet being partitioned into a plurality of separate data partitions capable of being independently decoded, to then be coded by the respective connected components.

19. A progressive and error-resilient coding method of a polygonal three dimensional (3D) mesh object (MO), comprising the steps:
  (a) dividing the polygonal 3D MO into one or more connected components;
  (b) generating a vertex graph and a pair of triangle tree/triangle data for each of the connected components; and
  (c) coding the vertex graph and triangle tree/triangle data constituting the connected components in conformity with mesh object base layers (MOBLs) each having a variable bitstream type in accordance with the properties of information to be coded, capable of being independently decoded for the respective connected components.

20. The progressive and error-resilient coding method according to claim 19, wherein in the step (c), the structure of coded bitstreams is represented using some of the bits in a start code of the data partition as a partition type.

21. The progressive and error-resilient coding method according to claim 20, wherein the partition type includes a 0-th partition type (partition_type_0) in which the information corresponding to one or more connected components is collected to construct a data partition to then be coded.

22. The progressive and error-resilient coding method according to claim 21, wherein the MOBL in which the 0-th partition type is coded further includes a plurality of bits indicative of the presence of further connected components to be coded after the respective connected components are coded.

23. The progressive and error-resilient coding method according to claim 20, wherein the partition type includes a first partition type (partition_type_1) in which the vertex graph information corresponding to one or more connected components are collected to construct a data partition to then be coded.

24. The progressive and error-resilient coding method according to claim 23, wherein the MOBL in which the first partition type is coded further includes a plurality of bits indicative of the presence of further vertex graph information to be coded after the vertex graph information corresponding to the respective connected components is coded.

25. The progressive and error-resilient coding method according to claim 20, wherein the partition type includes a second partition type (partition_type_2) in which the triangle tree/triangle data is partitioned into data partitions to then be coded.

26. The progressive and error-resilient coding method according to claim 25, wherein the MOBL in which the second partition type is coded further includes an identifier of the vertex graph information (codap_vg_id) corresponding to the respective triangle tree/triangle data in the respective data partitions.

27. The progressive and error-resilient coding method according to claim 26, wherein if there is only one vertex graph which is referred to by the triangle tree/triangle data, the identifier of the vertex graph information is not coded.

28. The progressive and error-resilient coding method according to claim 25, wherein the MOBL in which the second partition type is coded further includes a start index (codap_left_bloop_idx, codap_right_bloop_idx) of a bounding loop table for a triangle strip to be restored.

29. The progressive and error-resilient coding method according to claim 25, wherein the MOBL in which the second partition type is coded further includes a boundary prediction marker (codap_bdry_pred) indicating how the geometry and photometry shared by two or more data partitions are predicted.

30. The progressive and error-resilient coding method according to claim 20, wherein the partition type includes a third partition type (partition_type_3) in which a connected component is constructed as a data partition to then be coded.

31. In coding a triangle three dimensional (3D) mesh object (MO) for incremental build-up and error resilience, a method for partitioning the triangle 3D MO into data partitions to be packetized, the method comprising the steps:
  (a) calculating total bit generation amounts of triangles while the triangles contained in a triangle tree are sequentially traversed;
  (b) accumulating the total bit generation amounts calculated in step (a); and
  (c) if the accumulated value of step (b) is smaller than the product of a packet size and a packet allowance, repeatedly performing the steps (a) and (b) on the next traversed triangle contained in the triangle tree, and if not, triangle tree/triangle data of the traversed triangles are partitioned into data partitions to be packetized.

32. The partitioning method according to claim 31, wherein if the triangle traversed in step (a) is a branching triangle, the method further comprises the step:
  (d) if the sum obtained by adding the accumulated value of step (b) and the bit generation amount obtained by coding all triangles contained in dependent trees determined by the traversing order is smaller than the sum of the packet size and the packet allowance, repeatedly performing the steps (a) through (c), and if not, triangle tree/triangle data of the triangles traversed until the branching triangle is reached are partitioned into data partitions to be packetized.

33. The partitioning method according to claim 31, wherein if the triangle traversed in step (a) is a branching triangle, the method further comprises the step:
  (d) if the sum obtained by adding the accumulated value of step (b) and the bit generation amount predicted by the size of dependent trees determined by the traversing order is smaller than the sum of the packet size and the packet allowance, repeatedly performing the steps (a) through (c), and if not, triangle tree/triangle data of the triangles traversed until the branching triangle is reached are partitioned into data partitions to be packetized.

34. A progressive and error-resilient coding method of a polygonal three dimensional (3D) mesh object (MO), comprising the steps:
  (a) dividing the polygonal 3D MO into one or more connected components;

(b) generating a vertex graph and a pair of triangle tree/triangle data for each of the connected components; and (c) coding the vertex graph constituting the connected components; and (d) constructing the triangle tree/triangle data as virtual connected components and coding the same by adding virtual bit pairs to data partitions obtained by partitioning the triangle tree/triangle data.

35. The progressive and error-resilient coding method according to claim 34, wherein the partitioning in step (d) is performed only at the main branch of the triangle tree.

36. The progressive and error-resilient coding method according to claim 35, wherein if the partitioning in step (d) is performed at a run or leaf of the triangle tree, a virtual connected component is constructed by adding a pair of (1, 1) to a pair of (trun, tleaf).

37. The progressive and error-resilient coding method according to claim 35, wherein if the partitioning in step (d) is performed at a branching triangle of the triangle tree, a virtual connected component is constructed by adding two pairs of (1, 1) to a pair of (trun, tleaf).

38. The progressive and error-resilient coding method according to claim 34, further comprising the step of reconstructing the polygonal 3D MO into a triangle 3D MO, before step (a).

39. The progressive and error-resilient coding method according to claim 38, wherein the partitioning in step (d) is performed only at the actual edge of a polygonal mesh, and the polygonal edge information of the first triangle contained in a data partition of the triangle tree/triangle data is not coded.

40. The progressive and error-resilient coding method according to claim 38, wherein the partitioning in step (d) is performed only at the actual edge and virtual edge of a polygonal mesh, the polygonal edge information of the first triangle contained in a 0-th partition type of the triangle tree/triangle data is not coded, and the polygonal edge information of the first triangle contained in the remaining partition types is coded.

41. The progressive and error-resilient coding method according to claim 34, wherein one-bit orientation markers are contained in the data partition for respective branching triangles positioned at the main branch, among all branching triangles present within the data partition constructed by the virtually connected components.

42. The progressive and error-resilient coding method according to claim 34, wherein the header of the data partition formed by partitioning the triangle tree/triangle data includes a start index of a bounding loop table so as to be independently restored from the previously restored data partitions.

43. The progressive and error-resilient coding method according to claim 42, wherein the start index is determined by the first left and right indices mapped in the bounding loop corresponding to starting vertices of triangles consecutively restored in the bounding loop table corresponding to the triangle tree/triangle data, and the indices of the bounding loop are determined to be within the range of the number of vertices plus 2.

44. The progressive and error-resilient coding method according to claim 42, wherein the start index is determined by the first left and right indices mapped in the bounding loop corresponding to starting vertices of triangles consecutively restored in the bounding loop table corresponding to the triangle tree/triangle data, and the indices of the bounding loop are determined in consideration of the overall mesh data.

45. The progressive and error-resilient coding method according to claim 34, wherein the header of the data partition formed by partitioning the triangle tree/triangle data further includes an identifier of a vertex graph (codap_vg_id) corresponding to the triangle tree/triangle data.

46. The progressive and error-resilient coding method according to claim 34, wherein the header of the data partition formed by partitioning the triangle tree/triangle data further includes a boundary prediction marker (codap_bdry_pred) indicating how the geometry and photometry shared by the data partition and the previously coded data partition are predicted.

47. The progressive and error-resilient coding method according to claim 34, wherein if the starting and ending positions of the data partition are at the main branch of the triangle tree, the geometry and photometry shared by data partition and the previously coded data partition are contained in only one data partition, and if the starting and ending positions of the data partition are at a dependent tree, it is determined whether the geometry and photometry shared by the data partition and the previously coded data partition are present or not, if present, the geometry and photometry are contained in both data partitions, and if not present, the geometry and photometry are contained in only one data partition.

48. The progressive and error-resilient coding method according to claim 34, wherein the triangle data contained in the triangle tree/triangle data includes marching, geometry and photometry arranged for each triangle constituting the corresponding triangle tree.

49. The progressive and error-resilient coding method according to claim 34, wherein the triangle data contained in the triangle tree/triangle data includes marching of all triangles constituting the corresponding triangle tree, geometry of all triangles and photometry of all triangles sequentially arranged.

50. A progressive and error-resilient decoding method of a polygonal three dimensional (3D) mesh object (MO), comprising the steps:

(a) dividing input bitstreams into units of mesh object base layers (MOBLs);

(b) determining a partition type of the MOBLs;

(c) if a vertex graph is contained in the MOBLs, decoding the vertex graph to generate a bounding loop table;

(d) if triangle tree/triangle data is contained in the MOBLs, decoding the triangle tree/triangle data to generate 3D MO; and (e) repeatedly performing the steps (a) through (d) to generate a 3D MO.

51. The progressive and error-resilient decoding method according to claim 50, wherein the step (a) comprises the steps of dividing the input bitstreams into polygonal 3D MO units, determining the type of a mesh object layer (MOL) contained in the polygonal 3D MO, and dividing the bitstreams in the MOL into mesh object base layer (MOBL) units if the 3D MO is capable of being decoded.

52. The progressive and error-resilient decoding method according to claim 50, wherein when the triangle tree/triangle data is decoded in the step (d), the decoding order of dependent trees following after the branching triangle is determined by the orientation marked in an orientation marker (td_orientation) in the case of decoding a branching triangle positioned at the main branch of the triangle tree.

53. The progressive and error-resilient decoding method according to claim 52, wherein all of the dependent trees are in the same traversing order.

54. The progressive and error-resilient decoding method according to claim 52, wherein the traversing order of a triangle within the dependent trees corresponds to the value of the orientation marker (td_orientation).

55. The progressive and error-resilient decoding method according to claim 52, wherein in the step (b), the partition type is determined by the value of the start code of the data partition.

56. The progressive and error-resilient decoding method according to claim 55, wherein the partition type includes a 0-th partition type (partition_type_0) in which the information corresponding to one or more connected components is collected to construct a data partition to then be coded.

57. The progressive and error-resilient decoding method according to claim 56, wherein when the MOBL of the 0-th partition type is coded, it is determined whether further connected components to be coded are present by a predetermined bit positioned after the respective connected components.

58. The progressive and error-resilient decoding method according to claim 54, wherein the partition type includes a first partition type (partition_type_1) in which the vertex graph information corresponding to one or more connected components are collected to construct a data partition to then be coded.

59. The progressive and error-resilient decoding method according to claim 58, wherein when the MOBL of the first partition type is coded, it is determined whether further vertex graph information to be coded is present by a predetermined bit (codap_last_vg) positioned after the vertex graph information corresponding to the respective connected components.

60. The progressive and error-resilient decoding method according to claim 55, wherein the partition type includes a second partition type (partition_type_2) in which the triangle tree/triangle data is partitioned into data partitions to then be coded.

61. The progressive and error-resilient decoding method according to claim 60, wherein when the MOBL of the second partition type is coded, the vertex graph information corresponding to the respective triangle tree/triangle data is identified by a vertex graph identifier (codap_vg_id) positioned before the triangle tree/triangle data.

62. The progressive and error-resilient decoding method according to claim 60, wherein when the MOBL of the second partition type is coded, if the vertex graph information corresponding to the respective triangle tree/triangle data can be uniquely identified, it is determined that the vertex graph identifier is not positioned before the triangle tree/triangle data.

63. The progressive and error-resilient decoding method according to claim 60, wherein the MOBL of the second partition type is coded independently from the previous data partition by the start index (codap_left_bloop_idx, codap_right_bloop_idx) of the bounding loop table positioned before the triangle tree/triangle data.

64. The progressive and error-resilient decoding method according to claim 60, wherein when the MOBL of the second partition type is coded, it is determined how the geometry and photometry shared by the previously decoded data partitions are predicted, by a bounding prediction marker positioned before the triangle tree/triangle data.

65. The progressive and error-resilient decoding method according to claim 55, wherein the partition type includes a third partition type (partition_type_3) in which a connected component is constructed as a data partition.

66. The progressive and error-resilient decoding method according to claim 50, wherein when the triangle tree/triangle data is decoded in step (d), if a branching triangle positioned at the main branch of the triangle tree is decoded, the Y-vertex indices are determined by the total size information (codap_branch_len) of a dependent tree positioned at one side branch.

67. A progressive and error-resilient decoding method of a polygonal three dimensional (3D) mesh object (MO), comprising the steps:

(a) dividing input bitstreams into units of mesh object base layers (MOBLs);

(b) determining a partition type of the MOBLs;

(c) if a vertex graph is contained in the MOBLs, decoding the vertex graph to generate a bounding loop table;

(d) if triangle tree/triangle data is contained in the MOBLs, decoding the triangle tree/triangle data in units of connected components to generate triangle 3D MO; and (e) if the connected components in the step (d) are virtual connected components, repeatedly performing the steps (a) through (d), and if not, completing the generation of a triangle 3D MO.

68. The progressive and error-resilient decoding method according to claim 67, wherein the MOBL containing the triangle tree/triangle data in the step (d) includes a start index (codap_left_bloop_idx, codap_right_bloop_idx) of a bounding loop table so as to be independently restored from the previously restored data partitions.

69. The progressive and error-resilient decoding method according to claim 68, wherein the start index is determined by the first left and right indices mapped in the bounding loop corresponding to starting vertices of triangles consecutively restored in the bounding loop table corresponding to the triangle tree/triangle data, and the indices of the bounding loop are determined in consideration of all meshes.

70. The progressive and error-resilient decoding method according to claim 68, wherein the start index is determined by the first left and right indices mapped in the bounding loop corresponding to starting vertices of triangles consecutively restored in the bounding loop table corresponding to the triangle tree/triangle data, and the indices of the bounding loop are determined to be within the range of the number of vertices plus 2.

71. The progressive and error-resilient decoding method according to claim 68, wherein in the step (d), if right index-left index-1 (codap_right_bloop_idx_codap_left_bloop_idx-1) is greater than the total number of triangles generated when only the triangle tree of the MOBL is restored, it is determined that the connected components are virtual connected components.

72. The progressive and error-resilient decoding method according to claim 71, wherein if the third triangle from the last one among the triangles decoded in the step (d) is a branching triangle, it is determined that two of virtual triangles exist in a pair of (trun, tleaf), and if not, it is determined that a pair of virtual triangles exist in a pair of (trun, tleaf), so that the triangle data of the virtual triangles are not coded.

73. The progressive and error-resilient decoding method according to claim 68, further comprising the step of reconstructing the triangle 3D MO into a polygonal 3D MO.

74. The progressive and error-resilient decoding method according to claim 73, wherein the partitioning during coding is performed only at the actual edge of the polygonal 3D MO and the polygonal edge of the first triangle contained in the MOBL of the triangle tree/triangle data is determined to be the actual edge without decoding.

75. The progressive and error-resilient decoding method according to claim 73, wherein the partitioning during coding is also performed within the polygonal 3D MO and the polygonal edge of the first triangle contained in the MOBL of the triangle tree/triangle data is determined as the actual edge without decoding.

76. The progressive and error-resilient decoding method according to claim 67, wherein the decoding order of dependent trees following after the branching triangle is determined by the orientation marked in an orientation marker (td_orientation) in the case of decoding a branching triangle, with respect to all branching triangles positioned within the MOBL constructed by virtual connected components.

77. The progressive and error-resilient decoding method according to claim 67, wherein the MOBL containing the triangle tree/triangle data in the step (d) includes a boundary prediction marker (codap_bdry_pre) indicating how the geometry and photometry shared by two or more MOBLs are predicted.

78. The progressive and error-resilient decoding method according to claim 77, wherein the value of the boundary prediction marker is 0, and it is determined that the geometry and photometry shared by the currently decoded MOBL and the previously decoded MOBL are not contained in the currently decoded MOBL.

79. The progressive and error-resilient decoding method according to claim 78, wherein when the geometry is decoded using a prediction value predicted by three ancestors visited previously in the current data partition and a coded value thereof, the prediction value is set to 0 if no ancestor value is admissible, the prediction value is set to the ancestor value if only one ancestor value is admissible, the prediction value is set to an arithmetic mean value of two admissible ancestor values if the two ancestor values are admissible and the distances between the two values and the current vertex are 1, the prediction value is set to either admissible ancestor values if only two ancestor values are admissible and the distance between either value and the current vertex are 1, and the prediction value is determined by a predetermined prediction method if three ancestor values are all admissible.

80. The progressive and error-resilient decoding method according to claim 77, wherein the value of the boundary prediction marker is 1, it is determined that the geometry and photometry shared by the currently decoded MOBL and the previously decoded MOBL are also contained in the currently decoded MOBL.

81. The progressive and error-resilient decoding method according to claim 80, wherein when the geometry is decoded using a prediction value predicted by three ancestors visited in the current data partition and a coded value thereof, the prediction value is determined by a predetermined prediction method on the assumption that no vertex is visited in the previous data partitions.

82. The progressive and error-resilient decoding method according to claim 67, wherein the triangle data contained in the triangle tree/triangle data includes marching, geometry and photometry arranged for each triangle constituting the corresponding triangle tree.

83. The progressive and error-resilient decoding method according to claim 67, wherein the triangle data contained in the triangle tree/triangle data includes marching of all triangles constituting the corresponding triangle tree, geometry of all triangles and photometry of all triangles sequentially arranged.

* * * * *